United States Patent
Kikuchi

(10) Patent No.: US 8,928,924 B2
(45) Date of Patent: Jan. 6, 2015

(54) PRINTING SYSTEM, PRINTING CONTROL APPARATUS, CONTROL METHOD OF PRINTING CONTROL APPARATUS, AND PROGRAM

(71) Applicant: Canon Kabushiki Kaisha, Tokyo (JP)

(72) Inventor: Shou Kikuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/098,958

(22) Filed: Dec. 6, 2013

(65) Prior Publication Data

US 2014/0160525 A1    Jun. 12, 2014

(30) Foreign Application Priority Data

Dec. 7, 2012   (JP) ................................ 2012-268454

(51) Int. Cl.
 *G06F 3/12*  (2006.01)
 *G06F 15/00* (2006.01)
 *G06K 15/00* (2006.01)

(52) U.S. Cl.
 CPC ............ *G06F 3/1237* (2013.01); *Y02B 60/1271* (2013.01)
 USPC ........... 358/1.15; 358/1.9; 358/1.13; 358/1.14

(58) Field of Classification Search
 USPC ............ 358/1.1, 1.4, 1.5, 1.6, 1.9, 1.11, 1.12, 358/1.13, 1.14, 1.15, 1.16, 1.17, 1.18
 See application file for complete search history.

(56) References Cited

FOREIGN PATENT DOCUMENTS

JP    2003-220742 A    8/2003

*Primary Examiner* — Thierry L Pham
(74) *Attorney, Agent, or Firm* — Canon U.S.A., Inc., IP Division

(57) ABSTRACT

A printing control apparatus configured to transmit a received job to an image processing apparatus transmits, in a case where, after receiving information indicating that preparation for transition to a power saving status is completed from the image processing apparatus, determination is made that a job to be preferentially transmitted to the image processing apparatus exists among the plurality of received jobs stored in a storage unit, the job to the image processing apparatus with priority over a job stored in the storage unit before the job.

13 Claims, 18 Drawing Sheets

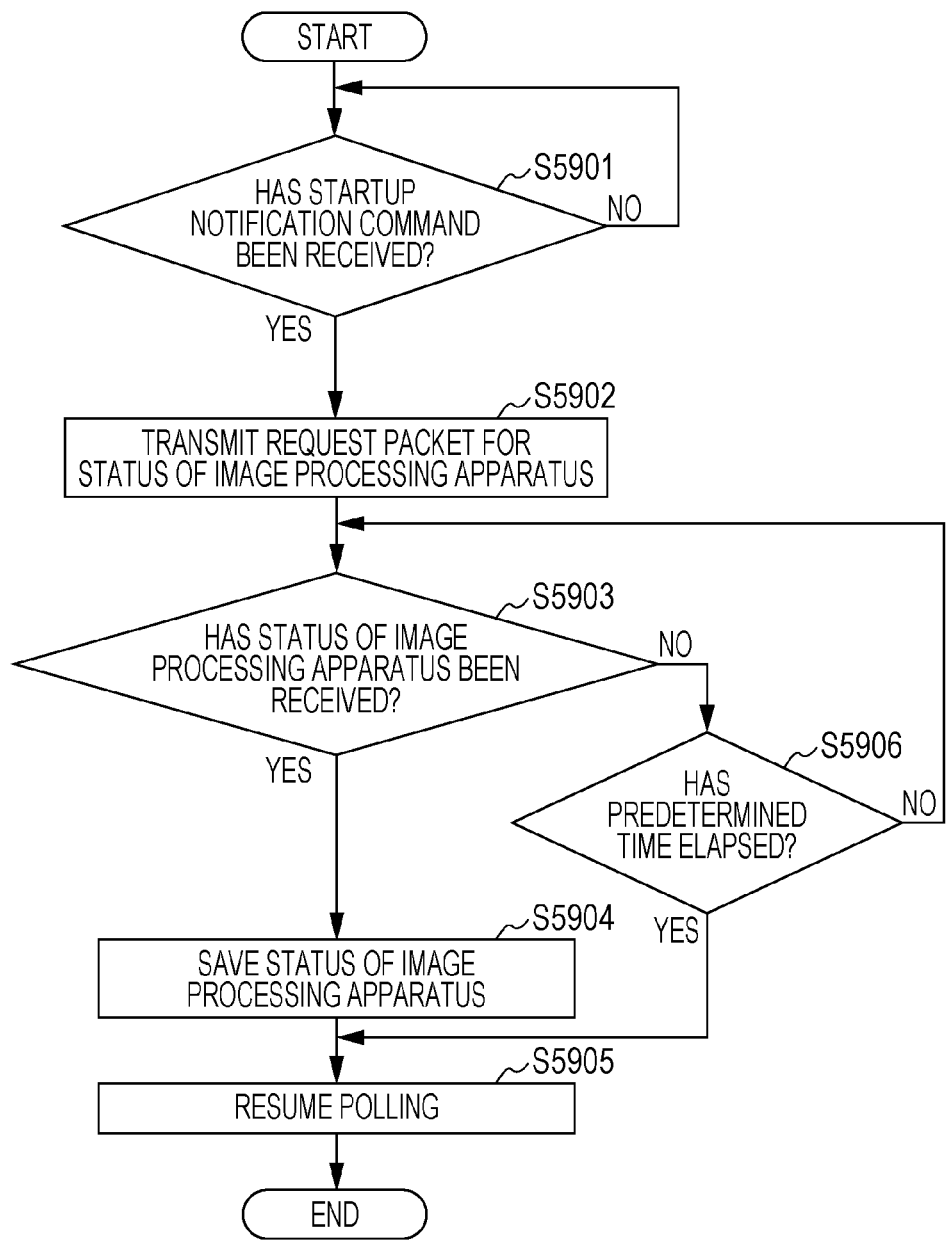

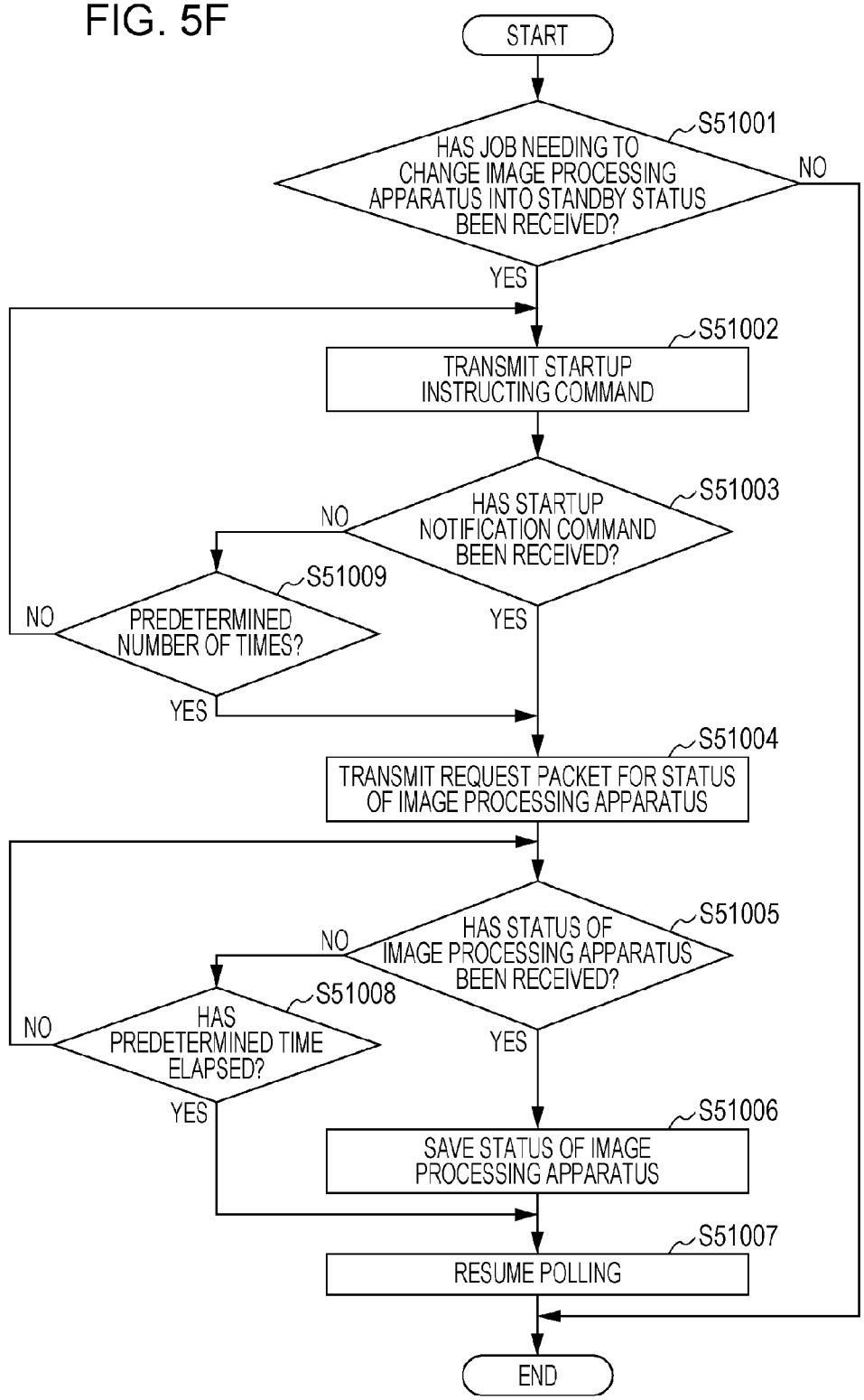

PRINTING SYSTEM, PRINTING CONTROL APPARATUS, CONTROL METHOD OF PRINTING CONTROL APPARATUS, AND PROGRAM

BACKGROUND OF THE INVENTION

1. Field of the Invention

The present invention relates to a printing system in which a printing control apparatus is connected to an image processing apparatus configured to perform power saving control, a control method of the printing control apparatus, and a program.

2. Description of the Related Art

Heretofore, transitioning of an image processing apparatus to a sleep status has been performed by the following method. Time until transition to the sleep status is set at the image processing apparatus beforehand, and upon an idle status of the image processing apparatus passing the set time, the image processing apparatus is automatically transitioned to the sleep status.

However, access to the image processing apparatus, being executed at the printing control apparatus side, has to be stopped in order for the image processing apparatus to which the printing control apparatus is connected to be transitioned to the sleep status. Therefore, it is necessary for the image processing apparatus to notify the printing control apparatus that transition to the sleep status will be performed (hereinafter, sleep preparation completion notification), transition to the sleep status after receiving a response thereof (hereinafter, sleep status start instruction), and to prevent returning from the sleep status as long as there is no transmission of a job or the like.

However, if the image processing apparatus notifies the printing control apparatus of the sleep preparation completion notification, and the printing control apparatus immediately returns the sleep status start instruction back to the image processing apparatus, there is the possibility that a job will be transmitted from the printing control apparatus to the image processing apparatus immediately after transitioning to the sleep status.

Once a job is transmitted from the printing control apparatus to the image processing apparatus, and the image processing apparatus returns from the sleep status, the image processing apparatus is prevented from transitioning to the sleep status again until a predetermined amount of time elapses, from a viewpoint of hard disk protection and so forth. If the processing of the job triggering the return from the sleep status is quickly completed, the image processing apparatus has to maintain an activated status with no processing being performed. Accordingly, a situation occurs wherein it is difficult to obtain expected power saving effects.

Therefore, there has been proposed a technique wherein, in a case where there is a job of which the processing point-in-time has been specified, processing of the job is performed consecutively after the job previously being processed, and thereafter, an image processing apparatus is transitioned to the sleep status, thereby reducing the number of times of transition to the sleep status (e.g., see Japanese Patent Laid-Open No. 2003-220742).

However, the above existing technique does not take into consideration jobs that do not have to be processed at the image processing apparatus, and accordingly, the following problem occurs.

In a case where there are a great number of jobs in those already scheduled to be processed that do not have to be processed at the image processing apparatus, there will be no input of a job from the printing control apparatus, and the image processing apparatus continuously awaits the sleep start instruction though no processing is being executed. As a result, electric power is wasted until the image processing apparatus is transitioned to the sleep status.

SUMMARY OF THE INVENTION

It has been found to be desirable to provide a method whereby power saving control, causing an image processing apparatus to be transitioned to a sleep status, while suppressing unnecessary power consumption at the image processing apparatus side can, be realized.

A printing system according to an embodiment of the present invention has the following configuration.

The printing system includes a printing control apparatus and an image processing apparatus configured to receive a job transmitted by the printing control unit. The image processing apparatus includes a notification unit configured to notify information indicating that preparation for transition to a power saving status is completed, to the printing control apparatus, a receiving unit configured to receive an instruction permitting transition to a power saving status from the printing control apparatus, and a power control unit configured to cause a power status of the image processing apparatus to proceed to a power saving status in response to reception of an instruction permitting transition to the power saving status. The printing control apparatus includes a job receiving unit configured to receive a job to be transmitted to the image processing apparatus, a storage unit configured to store a plurality of received jobs, a judging unit configured to judge whether or not a job to be preferentially transmitted to the image processing apparatus exists among the plurality of received jobs stored in the storage unit after receiving information indicating that preparation of transition to a power saving status is completed from the image processing apparatus, a job transmitting unit configured to transmit, in a case where the judging unit judges that a job to be preferentially transmitted to the image processing apparatus exists, the job to the image processing apparatus with priority over a job stored in the storage unit before the job, and a transmitting unit configured to transmit, in a case where the judging unit judges that no job to be preferentially transmitted to the image processing apparatus exists, an instruction permitting transition to a power saving status to the image processing apparatus.

Further features of the present invention will become apparent from the following description of exemplary embodiments with reference to the attached drawings.

BRIEF DESCRIPTION OF THE DRAWINGS

FIG. 5E is a flowchart for describing a control method of the printing control apparatus.

FIG. 5F is a flowchart for describing a control method of the printing control apparatus.

DESCRIPTION OF THE EMBODIMENTS

First Embodiment

Hereinafter, preferred embodiments for implementing the present invention will be described with reference to the appended drawings.

Image Forming System

Figure 1:
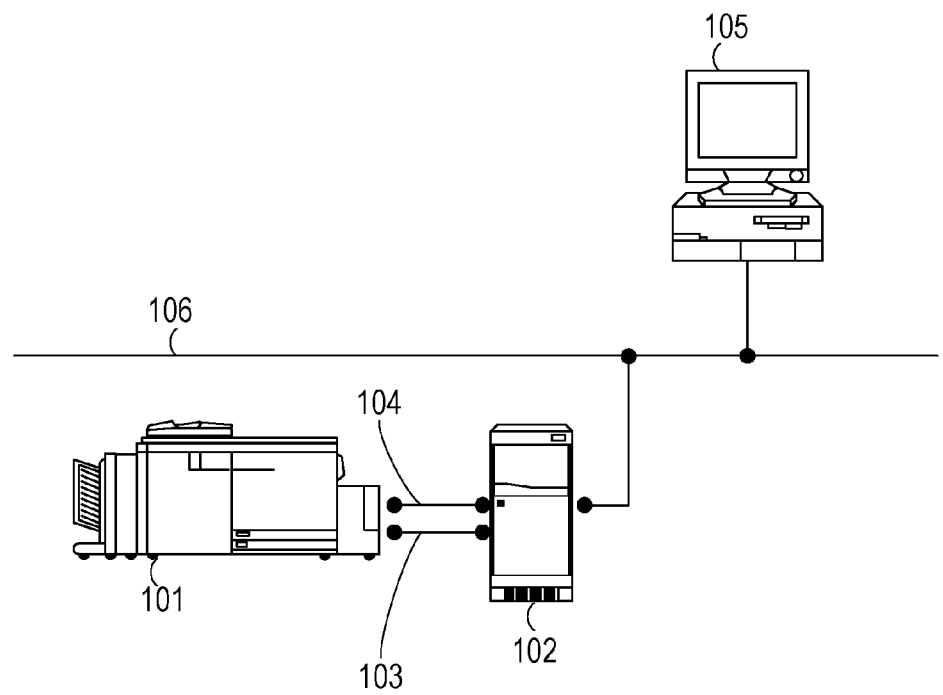
FIG. 1 is a diagram for describing a configuration of a printing system indicating the present embodiment.

The present embodiment exemplifies a printing system wherein an image processing apparatus and a printing control apparatus and an information processing apparatus are communicably connected via a network. FIG. 1 is a diagram for describing a configuration of the printing system according to the present embodiment. The printing system in FIG. 1 includes an image processing apparatus 101, a printing control apparatus 102, and an information processing apparatus 105. The printing control apparatus 102 performs control such as accepting a job from the information processing apparatus 105, and transmitting the job to the image processing apparatus 101. Though the present embodiment illustrates a case of a multifunction apparatus such as an multifunction printer (MFP) or the like as an example of the image processing apparatus, an image forming apparatus such as a printer or the like may be applicable as the image processing apparatus 101.

The image processing apparatus 101 and printing control apparatus 102 are connected through networks 104 and 103 as illustrated in FIG. 1. One of the networks 104 and 103 is used for transmission of a printed image, and the other is used for exchanging other information.

Note that, unless otherwise specified, the network used for connection between the image processing apparatus 101 and printing control apparatus 102 may be a single network or may be multiple networks, as long as the functions of the present invention are carried out.

The printing control apparatus 102 and information processing apparatus 105 are communicably connected via a network 106 such as a LAN, WAN, or the like. Note that the information processing apparatus 105 and image processing apparatus 101 do not directly exchange data and commands; rather, all processes are performed from the information processing apparatus 105 as to the printing control apparatus 102, and data and commands are transmitted to the image processing apparatus 101 by the printing control apparatus 102. The image processing apparatus 101 includes a scanner unit, a printer unit, and a data communication unit, which are configured so as to execute various functions such as scanning, printing, copying, and so forth.

The information processing apparatus 105 has functions to edit application files, perform printing instructions, and so forth. An operator can check job statuses, the statuses of the printing control apparatus 102 and image processing apparatus 101, and so forth, using the information processing apparatus 105. Also, the operator can transmit a shutdown instruction to the printing control apparatus 102 connected to the network 106 using the information processing apparatus 105.

The printing control apparatus 102 transmits to the image processing apparatus 101 various control instructions such as print jobs and sleep start instruction received from the information processing apparatus 105 connected thereto via the network 106. Also, the printing control apparatus 102 has various functions such as image processing, printing control, job management, and so forth.

Device Configuration of Printing Control Apparatus 102

Figure 2:
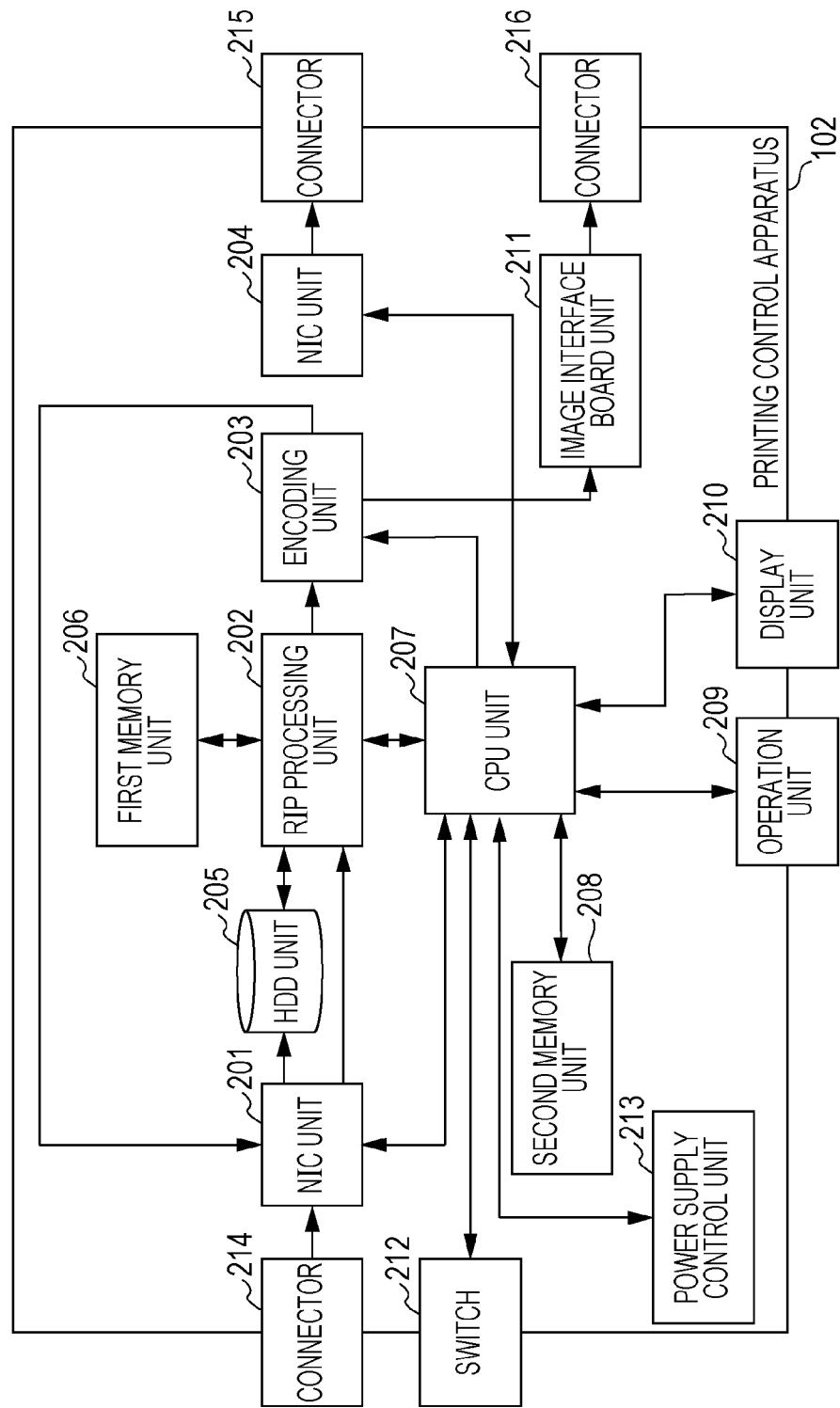
FIG. 2 is a block diagram for describing a configuration of the printing control apparatus illustrated in FIG. 1.

FIG. 2 is a block diagram for describing the configuration of the printing control apparatus 102 illustrated in FIG. 1.

In FIG. 2, reference numerals 214, 215, and 216 denote connectors, and 201 denotes a network interface card (NIC) unit serving as a first network interface configured to control low layer level connection with the network 103. The NIC unit 201 performs job reception processing for receiving jobs from the information processing apparatus 105.

Reference numeral 202 denotes a raster image processor (RIP) configured to convert a received print language, such as page description language (PDL) or the like, or a particular data format (compressed by JBIG (short for Joint Bi-level Image experts Group) or the like), into a raster image. Reference numeral 203 denotes an encoding unit configured to convert data converted into a raster image into print data or data format having a format the image processing apparatus 101 handles. Reference numeral 204 denotes a network interface controller (NIC) unit serving as a second network interface configured to control low layer level connection.

Reference numeral 205 denotes a hard disk drive (HDD) unit, which temporarily sequentially stores (spools) print data received at the NIC unit 201, or temporarily stores compressed data after the RIP processing. Thus, the printing control apparatus 102 is configured so as to store a plurality of received jobs in a received sequence.

Reference numeral 206 denotes a first memory unit, which is used for image rendering processing by the RIP processing unit 202. Reference numeral 207 denotes a central processing unit (CPU), which handles control of the entirety of the printing control apparatus 102. Reference numeral 208 denotes a second memory unit, which is used as a temporal data storage area by the CPU 207.

Reference numeral 209 denotes an operation unit, which includes buttons, keys, a touch panel, and so forth, and performs operations of the printing control apparatus 102. Reference numeral 210 denotes a display unit, which informs the operator of information using images or text. Also, reference numeral 211 denotes an image interface board (I board unit), one of which is connected to the connector 216.

Image data is transmitted by forming a dedicated transmission path using the I board unit 211 and connector 216. A switch 212 is configured to receive power supply on/off from the user. Upon the switch 212 being operated, an interruption is input to the CPU 207. Upon detecting the interruption, the CPU 207 controls a power supply control unit 213 in accordance with the current situation. Data packets from the information processing apparatus 105 to the printing control apparatus 102 are propagated to the network 103, and are taken into the printing control apparatus 102 via the connector 214.

Reception processing of data is performed within the printing control apparatus 102 by the NIC unit 201. Upon receiving print data, writing of received data in the HDD unit 205 is performed under control of the CPU 207 as appropriate. This is called queuing (spooling), and is generally performed to improve transmission speed of data, or the like. Data stored in the HDD unit 205 is read out from the RIP processing unit 202 by instructions from the CPU 207.

On the other hand, print data not queued is directly transmitted to the RIP processing unit 202 by instructions from the CPU 207. The print data thus transmitted to the RIP processing unit 202 is subjected to raster image conversion processing at the RIP processing unit 202.

Performed next is encoding of print data to a data format acceptable by the image processing apparatus 101, based on a data format acceptable by the image processing apparatus 101 already set at the encoding unit 203 serving as a second determining unit and data format conversion unit, and the received data format. This encoding processing is performed as appropriate, and accordingly encoding may be omitted when there is no need to perform encoding, such as a case where the received printing data format is acceptable by the image processing apparatus 101 without change, or the like.

Data after encoding needs to have a format acceptable by the image processing apparatus 101, which changes depending on capability of an interpretation unit housed in the image processing apparatus 101, for example, with regard to the particular print language format, the data format (compressed by a particular method such as JBIG), and so forth. Data thus encoded according to need is packetized again by the NIC unit 204 to be transmitted to the network 106, transmitted from the connector 215, and transmitted to the image processing apparatus 101 via the network 106. The image processing apparatus 101 which has received this data packet performs print processing on a recording medium such as paper in accordance with a print processing procedure which the apparatus itself has.

An arrangement may be made as another data transmission method wherein data is transmitted to the image interface board unit 211 via the encoding unit 203, passes through the connector 216, onto the network 105, and is transmitted to the image processing apparatus 101. The information processing apparatus 105 has to obtain, in order to transmit data packets to the printing control apparatus 102 in this manner, statuses of the printing control apparatus 102 and image processing apparatus 101 as appropriate, such as the power supply statuses and statuses of whether operating normally or not.

Therefore, polling is implemented to obtain statuses at certain time intervals, or a status change notification packet transmitted from the printing control apparatus 102 or image processing apparatus 101 is obtained, to change the processing of the image processing apparatus 105. As an example, upon receiving a power supply status notification packet transmitted from the image processing apparatus 101 in a case where power supply is ended, the information processing apparatus 105 stops the polling. This allows traffic from being sent on the network uselessly.

Control Configuration of Image Processing Apparatus 101

Figure 3:
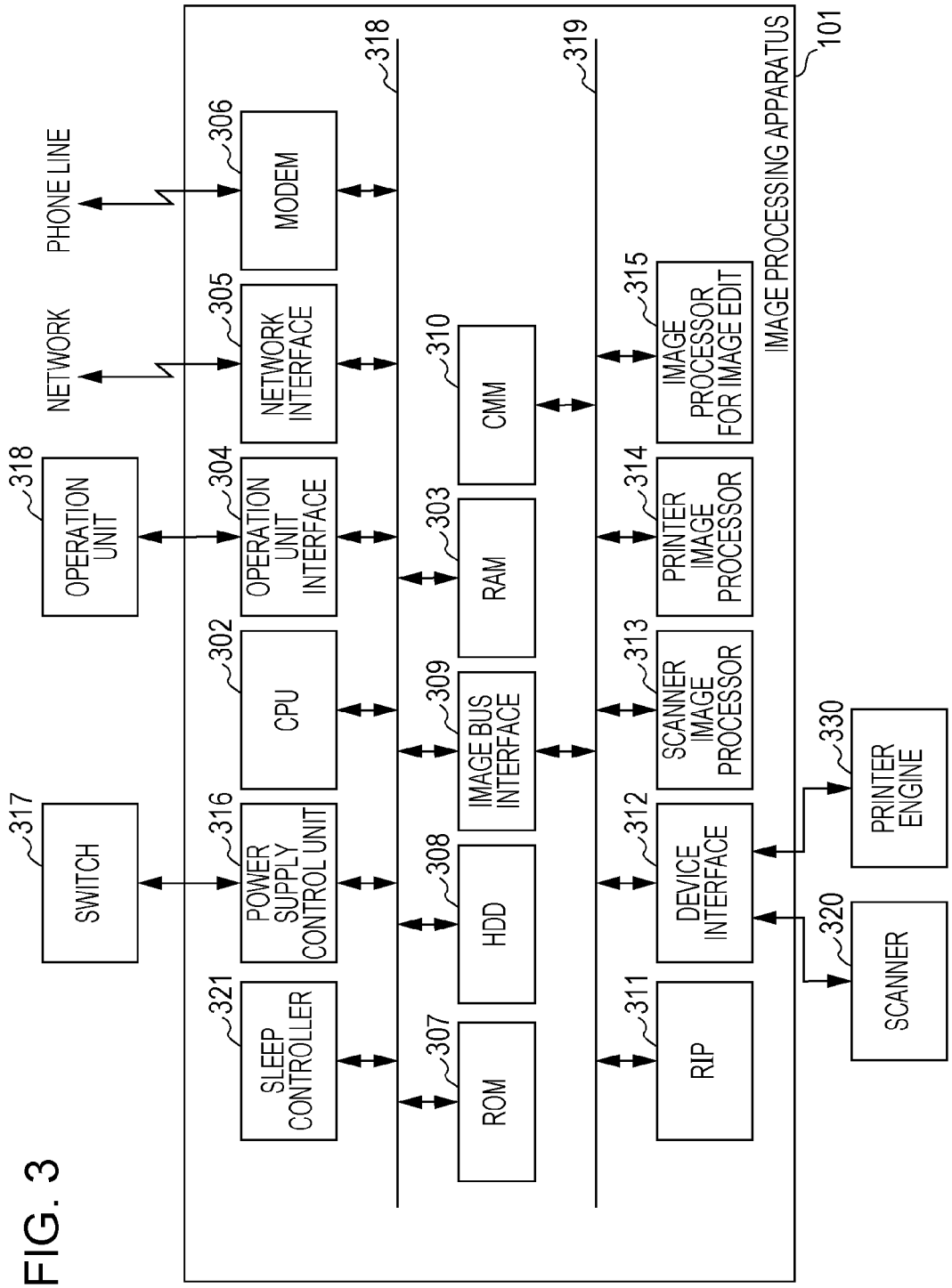
FIG. 3 is a block diagram for describing a configuration of the image processing apparatus illustrated in FIG. 1.

FIG. 3 is a block diagram for describing a configuration of the image processing apparatus 101 illustrated in FIG. 1.

The image processing apparatus 101 in FIG. 3 is connected to a scanner 320 which is an image input device or a printer engine 330 which is an image output device to perform control for reading or printing of image data. Also, the image processing apparatus 101 is connected to the network 104 or a phone line, thereby performing control for inputting/outputting image information or device information via the network 104.

A CPU 302 is a central processing unit configured to control the entirety of the MFP. RAM 303 is system work memory configured to operate the CPU 302, and is image memory configured to temporarily store input image data. Further, ROM 307 is boot ROM in which a system boot program is stored.

An HDD 308 is a hard disk drive, and stores system software for various processes and input image data and so forth. An operation unit interface 304 is an interface unit for an operation unit 318 including a display screen whereby image data and so forth can be displayed, and outputs operation screen data to the operation unit 318.

Also, the operation interface 304 serves to inform the CPU 302 of information input by an operator from the operation unit 318. A network interface 305 is realized by, for example, a LAN card or the like, and is connected to a network to perform input/output of information with an external device. Further, a modem 306 is connected to a phone line to perform input/output of information with an external device. The units mentioned above are arranged on a system bus 318.

An image bus interface 309 is an interface configured to connect the system bus 318 and an image bus 319 configured to transmit image data at high speed, and is a bus bridge configured to convert a data structure. There are connected onto the image bus 319 a raster image processor (RIP) 311, a device interface 312, a scanner image processing unit 313, a printer image processing unit 314, an image processing unit 315 for image editing, and a color management module 310.

The RIP 311 is a raster image processor, and renders page description language data into raster images. The device interface 312 performs synchronous/asynchronous system conversion of image data as to the scanner 320 or printer engine 330.

Also, the scanner image processing unit 313 performs various processes, such as correction, processing, editing, and so forth, on image data input from the scanner 320. The printer image processing unit 314 performs processing, such as correction, resolution conversion, and so forth on image data to be printed out, in accordance with the printer engine.

The image processing unit 315 for image editing performs various image processes such as rotation of image data, compression/decompression processing of image data, and so forth. A CMM (Color Management Module) 310 is a dedicated hardware module configured to subject image data to color conversion processing (also referred to as color space conversion processing) based on a profile and calibration data.

The profile is information such as a function, configured to convert color image data expressed in terms of device-dependent color space into color space (e.g., Lab or the like) that is not device-dependent. The calibration data is data configured to correct color reproduction characteristics of the scanner 320 or printer engine 330 in the color multifunction printer 3.

A switch 317 is configured to accept on/off operations from the user, and upon the switch 317 being operated, an interruption is input to the CPU 302 from the power supply control unit 316. Upon detecting the interruption, the CPU 302 controls the power supply control unit 316 in accordance with the current situation.

A sleep control unit 321 is configured to manage sleep status, and upon time set by the user using the operation unit 318 having elapsed, an interruption is input to the CPU 302 from the sleep control unit 321. The CPU 302 which has detected the interruption instructs the network interface 305 to transmit a sleep preparation completion notification. Also, upon the network interface 305 having received a sleep start instruction, an interruption is input to the CPU 302 from the sleep control unit 321. The CPU 302 which has detected the interruption controls the power supply control unit 316 to transition the image processing apparatus 101 to the sleep status.

Software Module Block Diagram

Figure 4:
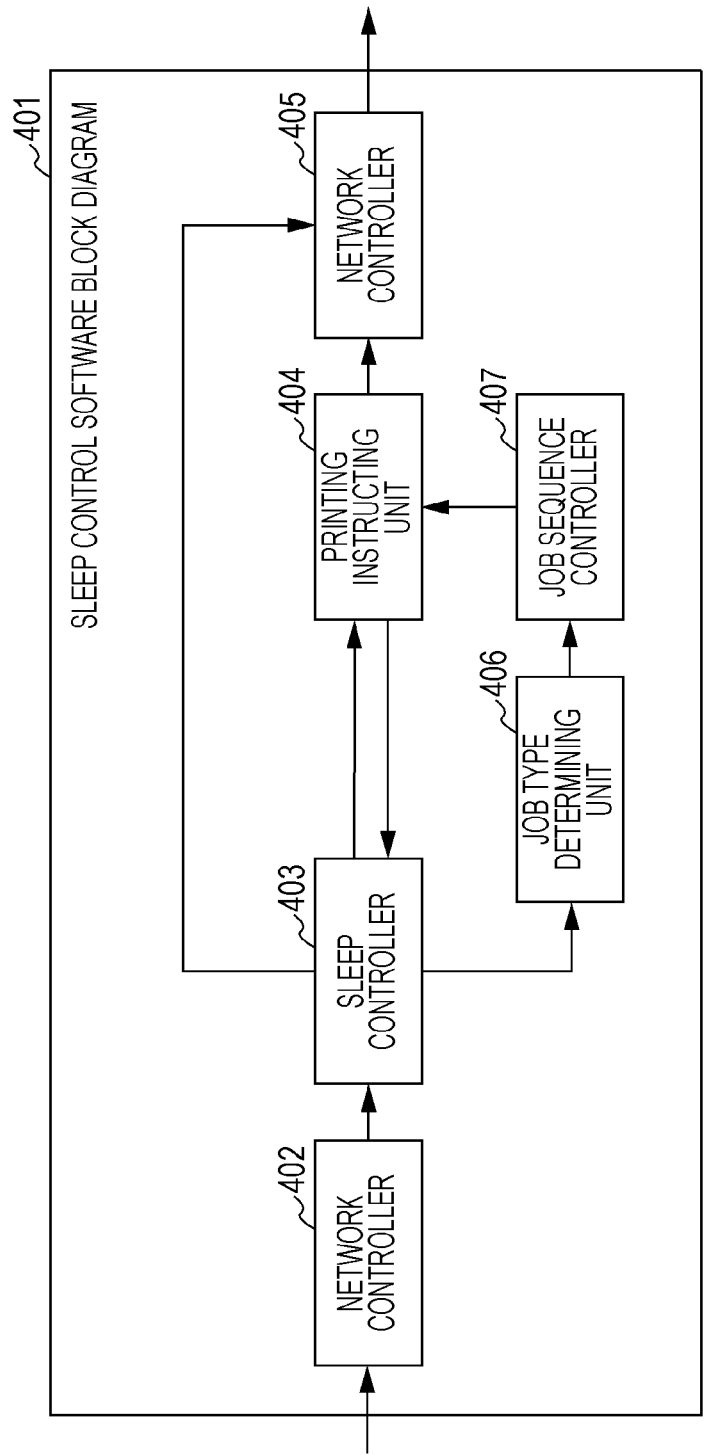
FIG. 4 is a diagram for describing a software module configuration of the printing control apparatus illustrated in FIG. 2.

FIG. 4 is a diagram for describing a software module configuration of the printing control apparatus 102 illustrated in FIG. 2. Note that the software modules are stored in the HDD within the printing control apparatus 102 as programs, and loaded to RAM and executed by a CPU.

A network control unit 402 in FIG. 4 performs transmission/reception of data with the information processing apparatus 105 using the network 106.

A sleep control unit 403 judges whether or not the sleep preparation completion notification has been received from the image processing apparatus 101, and then decides a processing method of the job received from the information processing apparatus 105. Also, the sleep control unit 403 receives information from a printing instructing unit 404, and transmits a sleep start instruction based on this information to the image processing apparatus 101 via a network control unit 405.

The printing instructing unit 404 converts the job received from the information processing apparatus 105 into a format acceptable by the image processing apparatus 101, and instructs the network control unit 405 to transmit data.

The network control unit 405 exchanges data with the image processing apparatus 101 using the network 103 or network 104.

A job type determining unit 406 determines whether or not the job received from the information processing apparatus 105 is a job needing processing at the image processing apparatus 101.

A job sequence control unit 407 receives the result of the job type determining unit 406 and controls the sequence of jobs to be processed at the image processing apparatus 101. A job of which the input has been accepted by the printing control apparatus 102 is stored in a processing waiting queue in the order in which the printing control apparatus 102 has accepted the processing instructions, and processing is executed in order from the job at the top of the queue. The job sequence control unit 407 can freely change the job sequence within the processing standby queue.

Hereinafter, description will be made regarding a power saving control example in the printing system illustrating the present embodiment in which the image processing apparatus 101 is connected to the printing control apparatus 102, and communicates with the information processing apparatus 105.

Transition of Power Status of Image Processing Apparatus 101

Figure 5A:
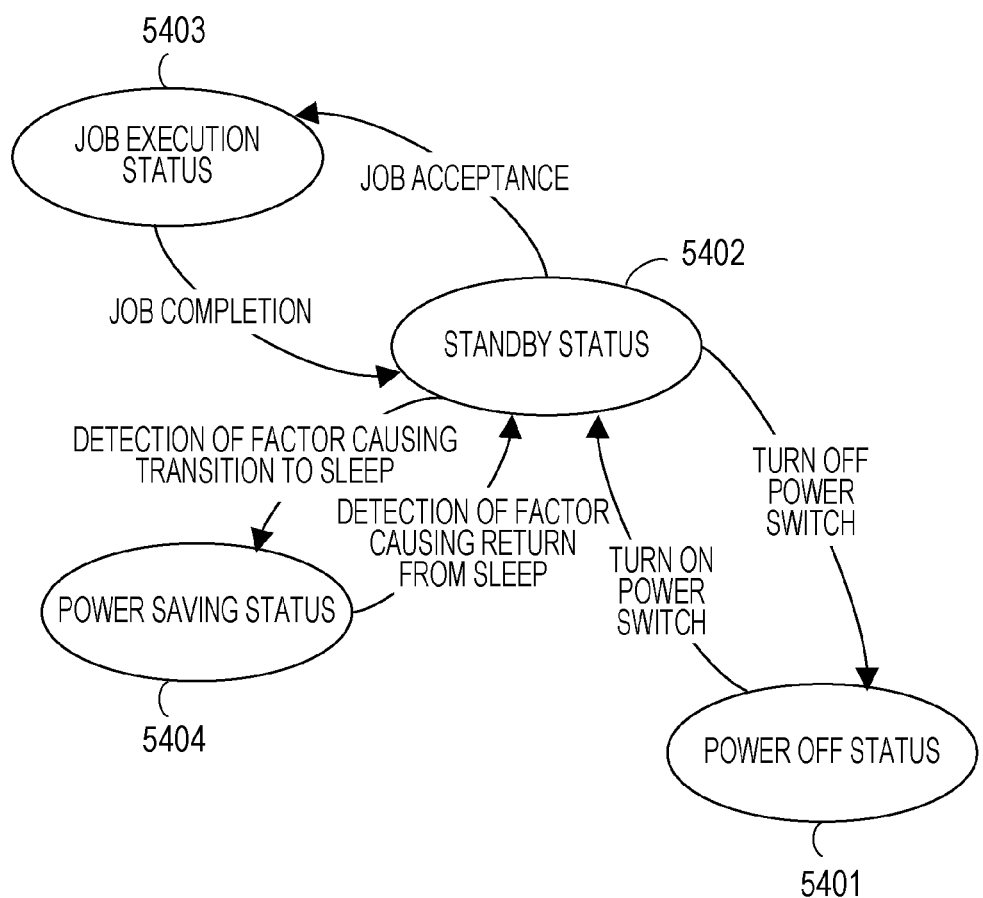
FIG. 5A is a diagram illustrating a power saving status of the image processing apparatus.

FIG. 5A is a status transition diagram illustrating transition of the power status of the image processing apparatus 101.

The power status of the image processing apparatus 101 according to the present embodiment is one of a power off status 5401, a standby status (first power status) 5402, a job execution status 5403, and a power saving status (second power status) 5404. Though the present embodiment exemplifies the above four statuses, the present invention is not restricted to these, and the image processing apparatus 101 may be transitioned to yet another power status.

For example, the image processing apparatus 101 may be transitioned to a suspended status or hibernation status. The suspended status is a status in which the image processing apparatus 101 can quickly return to the standby status 5402. In this suspended status, power distribution to the RAM 303 is maintained, and the image processing apparatus 101 is activated with the standby status 5402 using the status of the image processing apparatus 101 stored in the RAM 303. Also, the hibernation status is also a status in which the image processing apparatus 101 can quickly return to the standby status 5402. In this hibernation status, the power status is the same as the power off status 5401, and power supply to the units of the image processing apparatus 101 are stopped.

This differs from the power off status 5401 in that before being transitioned to the hibernation status, the status of the image processing apparatus 101 is stored in the HDD 308. In a case of returning to the standby status 5402 from the hibernation status, the image processing apparatus 101 quickly returns to the standby status 5402 based on the information stored in the HDD 308.

A relation of the execution status 5403>standby status 5402>power saving status 5404>power off status 5401 holds.

The power off status 5401 is a status in which the switch 317 of the image processing apparatus 101 is off, and power supply is stopped to all of the components of the image processing apparatus 101. Upon the user turning on the switch 317 in the power off status 5401, the image processing apparatus 101 transitions to the standby status 5402.

The standby status 5402 is a status in which the image processing apparatus 101 stands by for execution of a job, and power supply is performed to all of the components of the image processing apparatus 101. Note that in the standby status 5402, power supply is not necessarily performed to all of the components of the image processing apparatus 101. Accordingly, an arrangement may be made wherein power is supplied only to essential components, and not to other components other than these (e.g., the operation unit 318 or the like). Upon accepting a job from the information processing apparatus 105 via the printing control apparatus 102 in the standby status 5402, the image processing apparatus 101 transitions to the job execution status 5403. Also, upon a factor causing a sleep transition occurring in the standby status 5402, the image processing apparatus 101 transitions to the power saving status 5404.

Examples of a factor causing a sleep transition include (1) A sleep transition button (not illustrated) being pressed by the user, (2) A predetermined amount of time having elapsed without a print job, a scan job, or the like, having been executed in the standby status 5402, and (3) A predetermined amount of time having elapsed without the remote UI of the image processing apparatus 101 having been accessed from the information processing apparatus 105.

Also, upon the switch 317 being turned off by the user in the standby status 5402, shutdown processing is executed, and the image processing apparatus 101 is transitioned to the power off status 5401. The term "shutdown processing" means processing to quit an OS or application, in order to quit the image processing apparatus 101.

The job execution status 5403 is a status in which the image processing apparatus 101 is executing a job, and power is being supplied to all of the components of the image processing apparatus 101. Note that, even in the job execution status 5403, power does not necessarily have to be supplied to all of the components of the image processing apparatus 101, and accordingly, an arrangement may be made wherein power is supplied to only essential components, and is not supplied to components other than these (e.g., the operation unit 318 or the like), or to non-essential components for the job. Specifically, in a case where a print job to form an image on paper is being executed, power supply to the operation unit 318 and scanner 320 and so forth which are not used for execution of the print job may be stopped. Upon the job ending in the job execution status 5403, the image processing apparatus 101 transitions to the standby status 5402.

The power saving status 5404 is a status in which the image processing apparatus 101 is standing by with power conserved, and is a status in which power is supplied to some controllers of the image processing apparatus 101 including the network interface 305. In this power saving status 5404, power supply is stopped to the scanner 320, printer engine 330, operation unit 318, and so forth. Upon a factor causing return from sleep being accepted in the power saving status 5404, the image processing apparatus 101 is transitioned to the standby status 5402. Note that the network interface 305 can respond to simple packets being transmitted via the network even in the power saving status 5404. This function is called proxy response. Examples of simple packets include a request according to Address Resolution Protocol (ARP), status acquisition according to Simple Network Management Protocol (SNMP), and neighborhood search according to Internet Control Message Protocol (ICMP).

Examples of a factor causing return from sleep include (1) A return from sleep button being pressed by the user, and (2) A job being accepted by the information processing apparatus 105.

Operational Description of Image Processing Apparatus 101 when Image Processing Apparatus 101 is Transitioned to Power Saving Status 5404

Figure 5B:
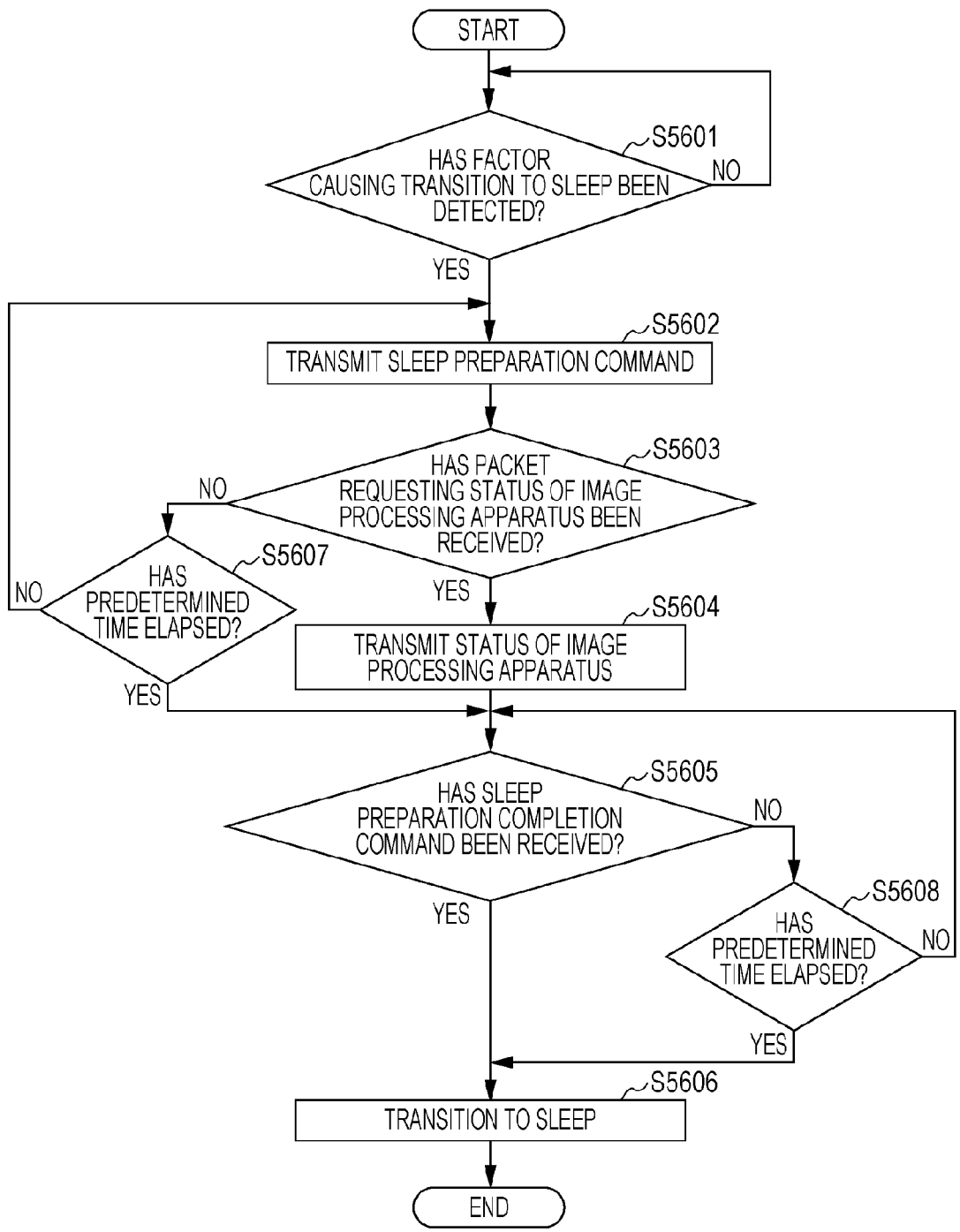
FIG. 5B is a flowchart for describing a control method of the image processing apparatus.

FIG. 5B is a flowchart of the image processing apparatus 101 in a case where the image processing apparatus 101 is transitioned to the power saving status 5404. Next, description will be made regarding operation of the image processing apparatus 101 in a case where the image processing apparatus 101 is transitioned to the power saving status 5404, with reference to FIG. 5B. Note that the flowchart illustrated in FIG. 5B is realized by the CPU 302 executing a program loaded to the RAM 303.

Upon the image processing apparatus 101 being transitioned to the standby status 5402, such as after the image processing apparatus 101 executes a job, or the like, the CPU 302 determines whether or not there is a factor causing a sleep transition (S5601). The CPU 302 repeats this determination until there is a factor causing a sleep transition (No in S5601). In a case where the CPU 302 has determined that there is a factor causing a sleep transition (Yes in S5601), the CPU 302 causes the network interface 305 to transmit a sleep preparation command (S5602). The sleep preparation command is a command requesting the printing control apparatus 102 to stop periodically obtaining information of the image processing apparatus 101. The command requesting is a command requesting to stop periodically obtaining a management information base (MIB) of the image processing apparatus 101. This sleep preparation command is transmitted to the printing control apparatus 102 via the network 103 or the like (S5602).

Next, the CPU 302 determines whether or not an acquisition request packet of the status of the image processing apparatus 101 has been received from the printing control apparatus 102 (S5603). In a case of determining that this acquisition request packet has been received (Yes in S5603), the CPU 302 generates a packet indicating the status of the image processing apparatus 101, and causes the network interface 305 to transmit the generated packet (S5604).

Thereafter, the CPU 302 determines whether or not a sleep preparation completion command has been received from the printing control apparatus 102 as response information to the transmitted sleep preparation command (S5605). In response to having received the sleep preparation completion command (Yes in S5605), The CPU 302 causes the image processing apparatus 101 to be transitioned from the standby status 5402 to the power saving status 5404 (S5606). Specifically, the CPU 302 instructs the power supply control unit 316 to turn off a relay. Thus, the relay is turned off, and power supply to the printer engine 330 and scanner 320 is stopped. The CPU 302 executes a sleep transition process before power supply is stopped by the power control unit 316. This sleep transition process saves in the RAM 303 the status immediately before the image processing apparatus 101 is transitioned to the power saving status 5404.

Note that in a case where determination is made in S5603 that an acquisition request packet of the status of the image processing apparatus 101 has not been received (No in S5603), the CPU 302 determines whether or not predetermined time has elapsed after transmitting the sleep preparation command (S5607). In a case where predetermined time has not elapsed yet (No in S5607), the CPU 302 causes the network interface 305 to transmit a sleep preparation command again (S5602). On the other hand, in a case where predetermined time has elapsed (Yes in S5607), the CPU 302 does transmit the status of the image processing apparatus 101, and proceeds to S5605.

Also, even in a case where determination is made in S5605 that a sleep preparation completion command has not been received yet (No in S5605), if predetermined time has elapsed, the CPU 302 performs a sleep transition process (S5606).

Operational Description of Printing Control Apparatus 102 when Image Processing Apparatus 101 is Transitioned to Power Saving Status 5404

Figure 5C:
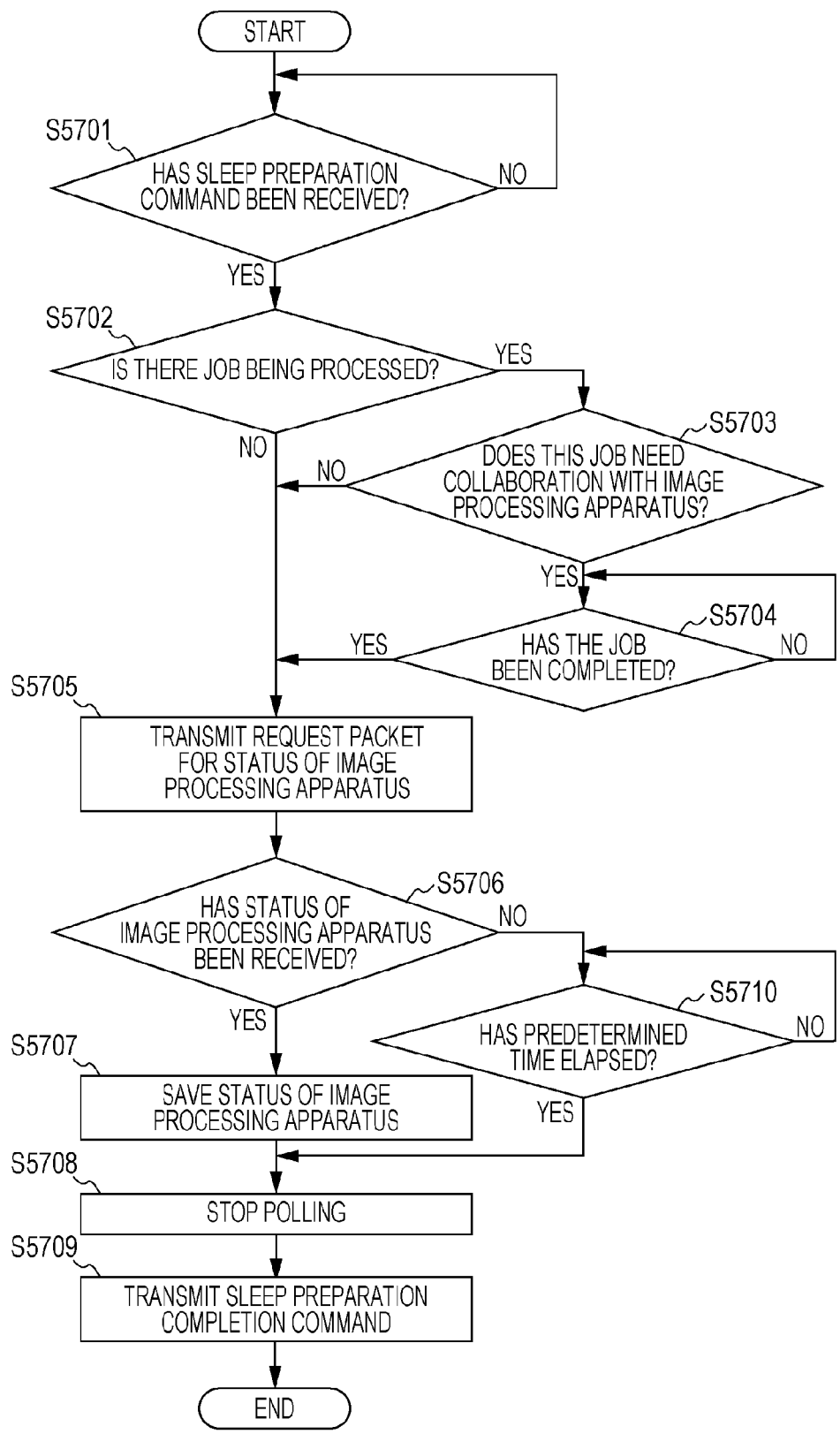
FIG. 5C is a flowchart for describing a control method of the printing control apparatus.

FIG. 5C is a flowchart of the printing control apparatus 102 in a case where the image processing apparatus 101 is transitioned to the power saving status 5404. Next, description will be made regarding operation of the printing control apparatus 102 in a case of the image processing apparatus 101 being transitioned to the power saving status 5404, with reference to FIG. 5C. The flowchart illustrated in FIG. 5C is realized by the CPU 207 executing a program loaded to the second memory unit 208.

First, the CPU 207 determines whether or not a sleep preparation command transmitted from the image processing apparatus 101 has been received (S5701). The CPU 207 repeats this determination until a sleep preparation command is received (No in S5701). In a case of determining that a sleep preparation command has been received (Yes in S5701), the CPU 207 determines whether or not there is a job being processed (S5702). In a case of determining that there is a job being processed (Yes in S5702), the CPU 207 checks the type of the job being processed (S5703). In this S5703, the CPU 207 determines whether or not the type of the job being processed is the type of a job needing collaboration with the image processing apparatus 101. Examples of the job needing collaboration with the image processing apparatus 101 include a print job and a scan job. Also, a job stored in "BOX" (HDD unit 205) of the image processing apparatus 101 and not executed is a job needing collaboration with the image processing apparatus 101.

On the other hand, examples of a job not needing collaboration with the image processing apparatus 101 include a hold job where only RIP processing is performed at the printing control apparatus 102. In a case of determining that the type of the job being processed is the type of a job needing collaboration with the image processing apparatus 101 (Yes in S5703), the CPU 207 determines whether or not the job being processed has ended (S5704). The CPU 207 repeats this determination until the job being processed ends (No in S5704). Upon the job being processed ending (Yes in S5704), the CPU 207 executes processing in S5705. Note that in a case where the job being processed is a print job which is a job that the printing control apparatus 102 needs to subject to RIP processing and to transmit to the image processing apparatus 101, the CPU 207 performs control as follows. The CPU 207 determines that the job being processed has ended at the time of the RIP processing at the printing control apparatus 102 being completed. Next, upon receiving a sleep preparation command before the printing control apparatus 102 transmits the image data subjected to the RIP processing to the image processing apparatus 101, the printing control apparatus 102 executes processing up to the RIP processing. However, the image data subjected to the RIP processing is not transmitted to the image processing apparatus 101. Also, upon receiving a sleep preparation command after the printing control apparatus 102 transmits the image data subjected to the RIP processing to the image processing apparatus 101, the printing control apparatus 102 does not interrupt transmission of this image data subjected to the RIP processing. After transmission of the image data subjected to the RIP processing is completed, the CPU 207 executes the processing in S5705.

Also, in a case where determination is made in S5703 that the type of the job being processed is that not needing collaboration with the image processing apparatus 101 (No in S5703), the CPU 207 executes the processing in S5705. Also, in a case where determination is made in S5702 that there is no job being processed (No in S5702), the CPU 207 executes the processing in S5705.

In S5705, the CPU 207 causes the NIC unit 204 to transmit a device status request packet to obtain the status of the image processing apparatus 101 (S5705). Next, the CPU 207 determines whether or not a packet indicating the status of the image processing apparatus 101 has been received from the image processing apparatus 101 (S5706). In a case of determining that a packet indicating the status of the image processing apparatus 101 has been received (Yes in S5706), the CPU 207 saves the status of the image processing apparatus 101 in the second memory unit 208 or HDD unit 205 (S5707). Sheet information of a sheet tray (sheet type, size, and remaining amount) or the like is stored in the second memory 208 or HDD unit 205 as the status of the image processing apparatus 101. Next, the CPU 207 controls the NIC unit 204 so as to stop the printing control apparatus 102 from periodically obtaining information of the image processing apparatus 101 (S5708). Specifically, the CPU 207 controls the NIC unit 204 so as to stop the printing control apparatus 102 from periodically (e.g., 60 seconds interval) obtaining an MIB of the image processing apparatus 101 using polling.

Specifically, the CPU 207 stops obtaining
page feed cassette information (sheet type, and sheet size),
sheet remaining amount,
toner remaining amount,
location (setup location), and
paper discharge information (output bin, and existence/absence/full loaded of sheets).

Note that the printing control apparatus 102 according to the present embodiment may stop obtaining all of the MIBs of the image processing apparatus 101, or may stop obtaining a part of the MIBs. The image processing apparatus 101 according to the present embodiment can respond to obtaining of a part of the MIBs from the printing control apparatus 102 without returning to the standby status 5402 from the power saving status 5404 (this function is a proxy response).

According to this proxy response, the network interface 305 of the image processing apparatus 101 responds to an inquiry from the printing control apparatus 102. Therefore, the printing control apparatus 102 according to the present embodiment continuously performs obtaining of a part of the MIBs that the image processing apparatus 101 can perform proxy response without stopping obtaining of all of the MIBs.

Next, the CPU 207 causes the NIC unit 204 to transmit a sleep preparation completion command after communication between the image processing apparatus 101 and printing control apparatus 102 is stopped (S5709). In a case of having received this sleep preparation completion command, the image processing apparatus 101 is transitioned from the standby status 5402 to the power saving status 5404.

Note that, after the CPU 207 transmits a device status request packet in S5706, in a case where a packet indicating the status of the image processing apparatus 101 has not been obtained until predetermined time elapses (S5710), the CPU 207 proceeds to S5708. At this time, the CPU 207 does not save the status immediately before the image processing apparatus 101 is transitioned to the power saving status 5404.

Next, description will be made regarding operations of the image processing apparatus 101 and printing control apparatus 102 in a case where the image processing apparatus 101 is transitioned from the power saving status 5404 to the standby status 5402.

The image processing apparatus 101 returns from the power saving status 5404 to the standby status 5402 by a trigger at the image processing apparatus 101 side or a trigger at the printing control apparatus 102 side of the image forming system 100.

Figure 5D:
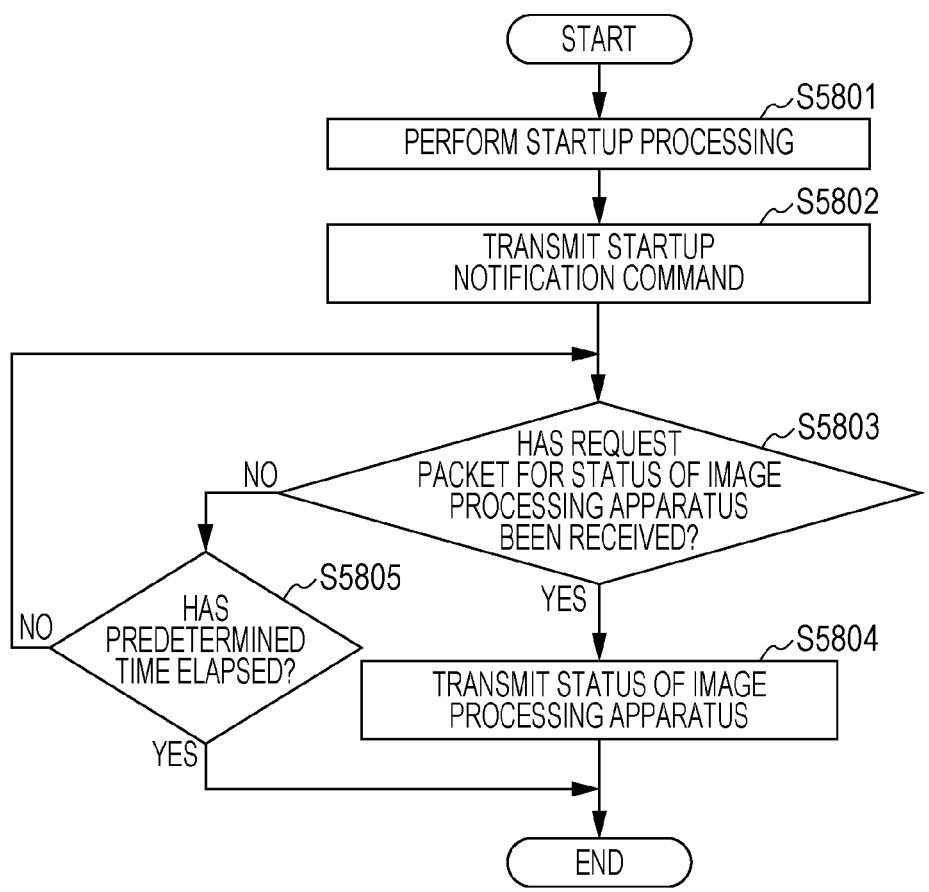
FIG. 5D is a flowchart for describing a control method of the image processing apparatus.

Operation of Image Processing Apparatus 101 in Case of Detecting Factor Causing Return from Sleep on Image Processing Apparatus 101 Side FIG. 5D is a flowchart illustrating operation of the image processing apparatus 101 in a case of a factor causing return from sleep having been detected on the image processing apparatus 101 side. Next, description will be made regarding operation of the image processing apparatus 101 in a case where the image processing apparatus 101 has been transitioned from the power saving status 5404 to the standby status 5402, with reference to FIG. 5D.

In a case where there is a factor causing return from sleep at the image processing apparatus 101 transitioned to the power saving status 5404, power to the CPU 302 and so forth is supplied by the relay not illustrated being turned on by the power control unit 316. Examples of a factor causing return from sleep include a return from sleep button being pressed by the user, a job being received from the information processing apparatus 105, and a fax being received from an external device.

Thus, the image processing apparatus 101 returns from the power saving status 5404 to the standby status 5402. The CPU 302 to which power is supplied executes a program loaded to the RAM 303, thereby executing operation of the image processing apparatus 101 in accordance with the flowchart in FIG. 5D.

The CPU 302 to which power is supplied first performs start-up processing (S5801). This start-up processing returns the image processing apparatus 101 to the status before the image processing apparatus 101 was transitioned to the power saving status 5404 using the status of the image processing apparatus 101 saved in the RAM 303. Next, the CPU 302 causes the network interface 305 to transmit a start-up notification command (S5802). Thereafter, the CPU 302 determines whether or not an acquisition request packet of the status of the image processing apparatus 101 has been received from the printing control apparatus 102 (S5803). In a case of determining that this acquisition request packet has been received (Yes in S5803), the CPU 302 generates a packet indicating the status of the image processing apparatus 101, and transmits the generated packet to the network interface 305 (S5804).

In a case where determination is made in S5803 above that the acquisition request packet of the status of the image processing apparatus 101 has not been received (No in S5803), the CPU 302 determines whether or not predetermined time has elapsed after transmitting the start-up notification command (S5805). Next, the CPU 302 waits of the predetermined time until the acquisition request packet of the status of the image processing apparatus 101 is received (S5805). In a case where the acquisition request packet has not been received even after waiting the predetermined time (Yes in S5805), the CPU 302 ends the processing without transmitting the status of the image processing apparatus 101.

Operation of Printing Control Apparatus 102 in Case of Detecting Factor Causing Return from Sleep on Image Processing Apparatus 101 Side FIG. 5E is a flowchart illustrating operation of the printing control apparatus 102 in a case where the image processing apparatus 101 returns from the power saving status 5404 to the standby status 5402. Next, description will be made regarding operation of the printing control apparatus 102 in a case where the image processing apparatus 101 has been transitioned from the power saving status 5404 to the standby status 5402, with reference to FIG. 5E. Note that the flowchart illustrated in FIG. 5E is realized by the CPU 207 executing a program loaded to the second memory unit 208.

First, the CPU 207 determines whether or not the start-up notification command has been received from the image processing apparatus 101 (S5901). In a case of determining that the startup notification command has been received (Yes in S5901), the CPU 207 causes the NIC unit 204 to transmit a device status request packet to obtain the status of the image processing apparatus 101 (S5902). Next, the CPU 207 determines whether or not a packet indicating the status of the image processing apparatus 101 has been received from the image processing apparatus 101 (S5903). In a case of determining that a packet indicating the status of the image processing apparatus 101 has been received (Yes in S5903), the CPU 207 saves the status of the image processing apparatus 101 in the second memory unit 208 or HDD unit 205 (S5904). Sheet information of a sheet tray (sheet type, size, and remaining amount) or the like is stored in the second memory 208 or HDD unit 205 as the status of the image processing apparatus 101 immediately after having returned to the power saving status 5404. Next, the CPU 207 controls the NIC unit 204 so as to resume communication between the printing control apparatus 102 and the image processing apparatus 101 (S5905). Specifically, the CPU 207 controls the NIC unit 204 so that the printing control apparatus 102 periodically (e.g., 60 seconds interval) obtains an MIB of the image processing apparatus 101 using polling.

Note that in S5906, in a case where a packet indicating the status of the image processing apparatus 101 has not been obtained by the predetermined time elapsing after the CPU 207 has transmitted a device status request packet (Yes in S5906), the CPU 207 proceeds to S5905. At this time, the CPU 207 is unable to save the status immediately after the image processing apparatus 101 returning from the power saving status 5404.

Operation of Printing Control Apparatus 102 in Case of Detecting Factor Causing Return from Sleep on Image Processing Apparatus 101 Side FIG. 5F is a flowchart of the printing control apparatus 102 in a case of returning the image processing apparatus 101 from sleep from the printing control apparatus 102 side. Description will be made regarding operation of the printing control apparatus 102 in a case of returning the image processing apparatus 101 from the power saving status 5404 to the standby status 5402 from the printing control apparatus 102 side, with reference to FIG. 5F. Note that the flowchart illustrated in FIG. 5F is realized by the CPU 207 executing a program loaded to the second memory unit 208.

The image processing apparatus 101 according to the present embodiment is transitioned from the power saving status 5404 to the standby status 5402 in a case where a print job has been transmitted from the information processing apparatus 105 to the printing control apparatus 102, or the like.

Upon receiving a job transmitted from the information processing apparatus 105, the CPU 207 of the printing control apparatus 102 determines whether or not this job where the image processing apparatus 101 needs to be transitioned to the standby status 5402 (S51001). Specifically, in a case where the job transmitted from the information processing apparatus 105 is a print job, the CPU 207 determines that this job is a job where the image processing apparatus 101 needs to be transitioned to the standby status 5402. This print job is a job printing data subjected to the RIP processing at the printing control apparatus 102 and also subjected to the RIP processing at the image processing apparatus 101.

Also, in a case where the job transmitted from the information processing apparatus 105 is a hold job, the CPU 207 determines that this job is a job not needing transitioning of the image processing apparatus 101 to the standby status 5402. This hold job is a job which performs until the RIP processing at the printing control apparatus 102, but is not automatically executed until printing at the image processing apparatus 101. Also, even in a case of reading an MIB relating to the printing control apparatus 102 alone, or receiving a job editing a print job on the printing control apparatus 102, the CPU 207 does not transition the image processing apparatus 101 to the power saving status 5404.

In a case of determining that the received job is a job not needing transitioning of the image processing apparatus 101 to the standby status 5402 (No in S51001), the CPU 207 ends the processing without transitioning the image processing apparatus 101 to the standby status 5402.

On the other hand, in a case of determining that the received job is a job needing to transition the image processing apparatus 101 to the standby status 5402 (Yes in S51001), the CPU 207 causes the NIC unit 204 to transmit a startup instructing command (S51002). After the startup instructing command is transmitted, the CPU 207 awaits a response from the image processing apparatus 101. Next, the CPU 207 determines whether or not a startup notification command has been received from the image processing apparatus 101 (S51003). In a case of determining that this startup notification command has been received (Yes in S51003), the CPU 207 causes the NIC unit 204 to transmit a device status request packet (S51004). Next, the CPU 207 determines whether or not a packet indicating the status of the image processing apparatus 101 has been received from the image processing apparatus 101 (S51005). In a case of determining that a packet indicating the status of the image processing apparatus 101 has been received (Yes in S51005), the CPU 207 saves the status of the image processing apparatus 101 in the second memory unit 208 or HDD unit 205 (S51006). Sheet information of a sheet tray (sheet type, size, and remaining amount) or the like is stored in the second memory unit 208 or HDD unit 205 as the status of the image processing apparatus 101 immediately after having returned to the power saving status 5404. Next, the CPU 207 controls the NIC unit 204 so as to resume communication between the printing control apparatus 102 and the image processing apparatus 101 (S51007). Specifically, the CPU 207 controls the NIC unit 204 so that the printing control apparatus 102 periodically (e.g., 60 seconds interval) obtains an MIB (Management Information Base) of the image processing apparatus 101 using polling.

Note that, in S51008, after the CPU 207 transmits a device status request packet, in a case where a packet indicating the status of the image processing apparatus 101 has not been obtained until predetermined time elapses (Yes in S51008), the CPU 207 proceeds to S51007. At this time, the CPU 207 does not save the status immediately after the image processing apparatus 101 returning from the power saving status 5404.

Also, in a case where determination is made in S51003 that this startup notification command has not been received (No in S51003), the CPU 207 transmits the startup instructing command a predetermined number of times (Yes in S51009). In a case where no startup notification command has been received from the image processing apparatus 101 even after the startup instructing command is transmitted a predetermined number of times (No in S51009), the CPU 207 proceeds to S51004.

Figure 5G:
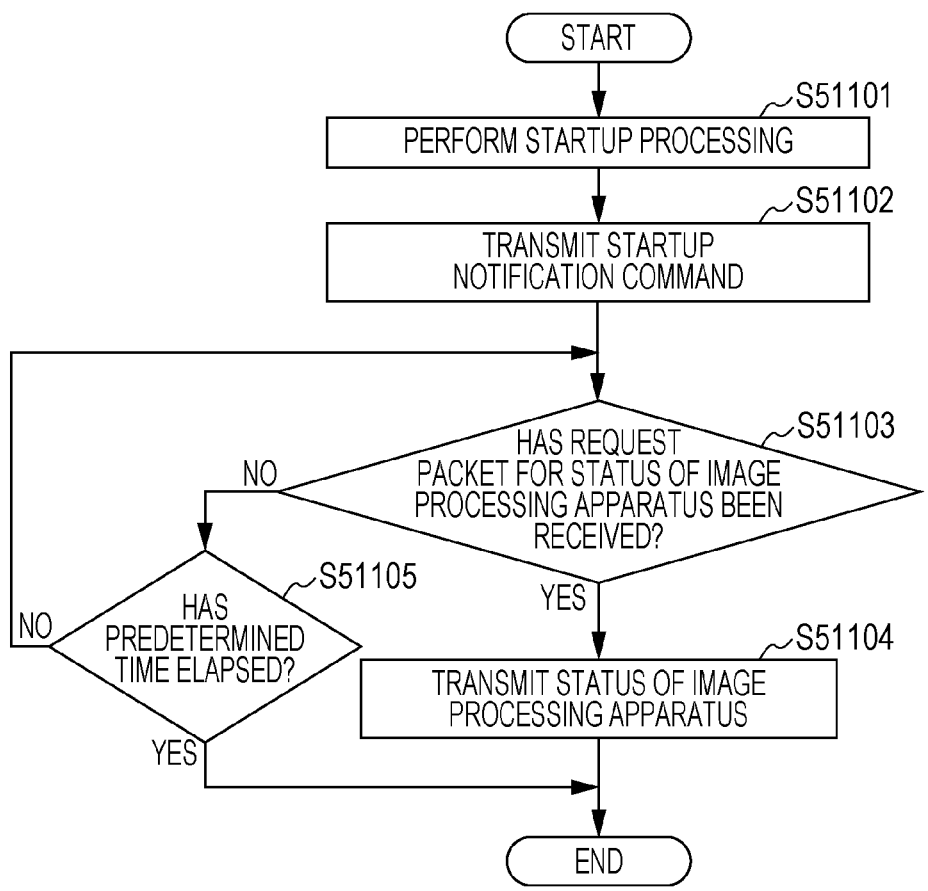
FIG. 5G is a flowchart for describing a control method of the image processing apparatus.

Operation of Image Processing Apparatus 101 in Case of Detecting Factor Causing Return from Sleep at Printing Control Apparatus 102 Side FIG. 5G is a flowchart of the image processing apparatus 101 in a case of returning the image processing apparatus 101 from sleep from the printing control apparatus 102 side. Description will be made regarding operation of the image processing apparatus 101 regarding a case of returning the image processing apparatus 101 from the power saving status 5404 to the standby status 5402 from the printing control apparatus 102 side, with reference to FIG. 5G.

At the image processing apparatus 101 in the power saving status 5404, power supply to the CPU 302 is stopped, but power is supplied to the network interface 305. Upon the startup instructing command transmitted in S5903 being received by the network interface 305, the power supply control unit 316 turns on the relay, thereby supplying power to the CPU 207 and so forth. Thus, the image processing apparatus 101 is returned from the power saving status 5404 to the standby status 5402. The CPU 302 to which power is supplied executes a program loaded to the RAM 303, thereby executing operation of the image processing apparatus 101 in accordance with the flowchart in FIG. 5G.

The CPU 302, to which power is supplied first, performs startup processing (S51101). The CPU 302 in this startup processing returns the image processing apparatus 101 to the status before the image processing apparatus 101 was transitioned to the power saving status 5404 using the status of the image processing apparatus 101 saved in the RAM 303. Next, the CPU 302 causes the network interface 305 to transmit a startup notification command (S51102). Thereafter, the CPU 302 determines whether or not an acquisition request packet of the status of the image processing apparatus 101 has been received from the printing control apparatus 102 (S51103). In a case of determining that this acquisition request packet has been received (Yes in S51103), the CPU 302 generates a packet indicating the status of the image processing apparatus 101, and causes the network interface 305 to transmit the generated packet (S51104).

Note that, in a case where determination is made in S51103 that no acquisition request packet has been received (No in S51103), the CPU 302 determines, after transmitting the startup notification command, whether or not the predetermined time has elapsed (S51105). Next, the CPU 302 waits the predetermined time until the acquisition request packet is received (S51105). In a case where no acquisition request packet has been received even after waiting the predetermined time (Yes in S51105), the CPU 302 ends the processing without transmitting the status of the image processing apparatus 101.

Inquiry from Client Computer

A job management tool configured to display, edit, and print a print job stored in the printing control apparatus 102 from the information processing apparatus 105 can obtain information regarding the image processing apparatus 101. In a case where the job management tool checks the setting and sheet remaining amount of the sheet tray of the image processing apparatus 101 when the image processing apparatus 101 is in the power saving status 5404, the printing control apparatus 102 does not inquire the image processing apparatus 101. The printing control apparatus 102 transmits, to the job management tool, information of the image processing apparatus 101 obtained immediately before being transitioned to the power saving status 5404 (S5705 to S5707). Thus, the job management tool (information processing apparatus 105) displays the status of the image processing apparatus 101.

Also, a printer driver to be installed in the information processing apparatus 105 has a two-way communication function for obtaining the device configuration of accessories of the image processing apparatus 101, and sheet information. The printing control apparatus 102 in the power saving status 5404 transmits information of the image processing apparatus 101 obtained immediately before being transitioned to the power saving status 5404 without inquiring the image processing apparatus 101 (S5705 to S5707). However, in a case where the information of the image processing apparatus 101 obtained immediately before being transitioned to the power saving status 5404 has been updated, the printing control apparatus 102 returns the image processing apparatus 101 from the power saving status 5404 to the standby status 5402, and performs updating of the information.

The image processing apparatus 101 in the printing system illustrated in the present embodiment causes the printing control apparatus 102 to stop periodically obtaining an MIB of the image processing apparatus 101 before the image processing apparatus 101 is transitioned to the power saving status 5404. After the printing control apparatus 102 stops periodically obtaining of an MIB of the image processing apparatus 101, the image processing apparatus 101 is transitioned from the standby status 5402 to the power saving status 5404. Thus, the image processing apparatus 101 does not return to the standby status 5402 from the power saving status 5404 by the printing control apparatus 102 periodically obtaining an MIB. Accordingly, power saving of the image processing apparatus 101 can be realized.

Hereinafter, an example will be described wherein power saving control is performed by determining the type of a job in a printing system capable of the above power saving control.

First Embodiment

Figure 6:
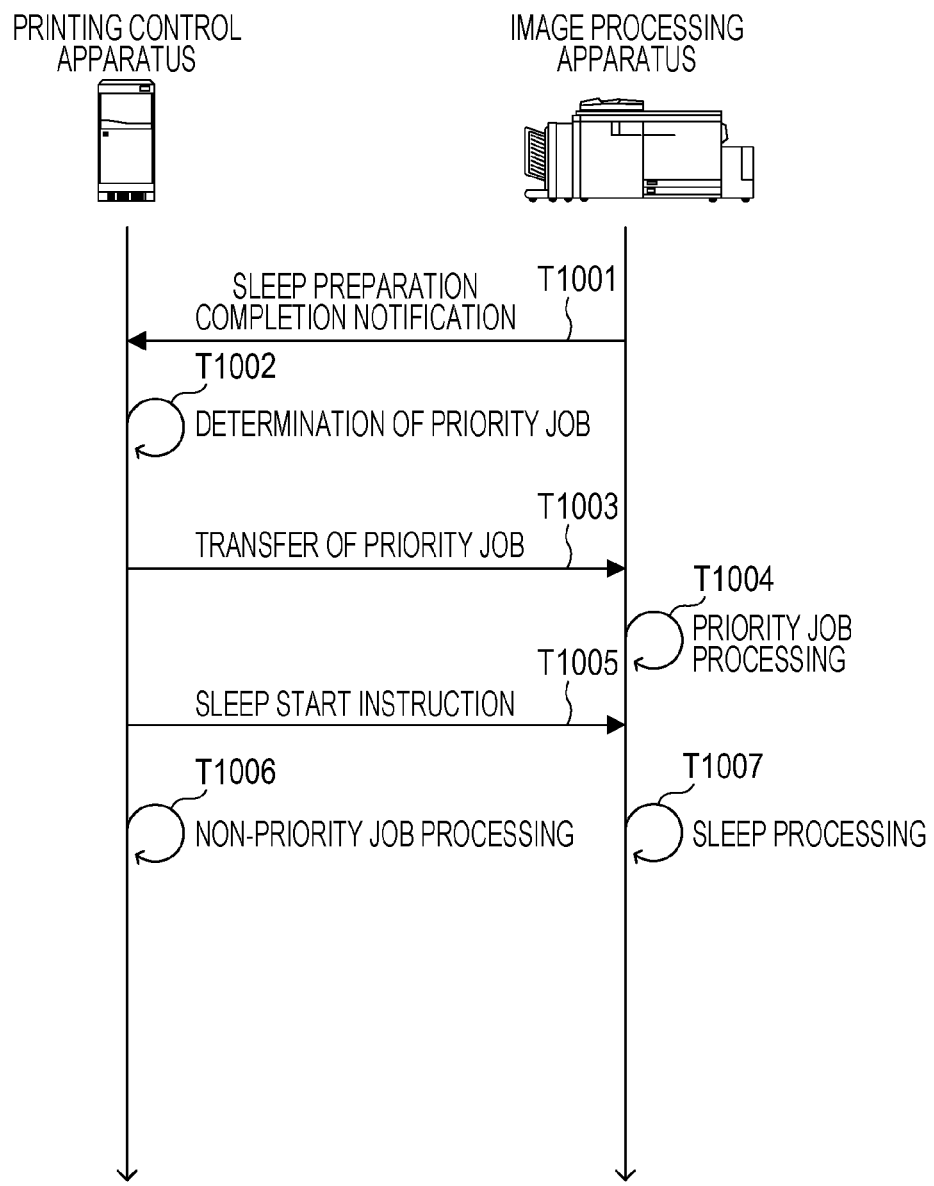
FIG. 6 is a sleep processing sequence example of the printing system.

FIG. 6 is a diagram illustrating sleep processing sequences of the image processing apparatus 101 and printing control apparatus 102 illustrated in FIG. 1. Hereinafter, an example will be described wherein, in response to the printing control apparatus 102 receiving a transition completion notification to a sleep status from the image processing apparatus 101, a job in the stored jobs which is to be processed at the image processing apparatus 101 is subjected to transmission processing with priority.

The image processing apparatus 101 in FIG. 6 transmits a sleep preparation completion notification 1001 to the printing control apparatus 102 upon predetermined time elapsing in an idle status (T1001). The printing control apparatus 102 which has received this sleep preparation completion notification 1001 searches whether or not there is a job needing processing at the image processing apparatus 101 out of jobs to be scheduled for processing now in the image processing apparatus 101. Next, priority job determination processing is performed wherein a corresponding job searched and obtained is set as a priority job (T1002). Note that the term "priority job" here means a job needing transmission of a job from the printing control apparatus 102 to the image processing apparatus 101, such a print job or a job to be stored in the image processing apparatus 101.

The printing control apparatus 102 preferentially transmits a job determined as a priority job to the image processing apparatus 101 regardless of a processing schedule sequence set to the printing control apparatus 102 (T1003).

The image processing apparatus 101 performs processing of the received priority job (T1004). The printing control apparatus 102 transmits a sleep start instruction to the image processing apparatus 101 (T1005) at the stage of having checked that the image processing apparatus 101 has ended the processing of the priority job (T1004). Thereafter, the printing control apparatus 102 performs processing of a non-priority job not needing processing at the image processing apparatus 101 (T1006).

Note that the term "non-priority job" here means a job not needing transmission of the job from the printing control apparatus 102 to the image processing apparatus 101, such as a job on which RIP alone is to be performed. Jobs on which RIP alone is to be performed are used as follows. Rendering of the image is performed beforehand, so the image can be confirmed, and once decision is made to print the image, the image can be printed quicker. The image processing apparatus 101 which has received the sleep start instruction is transitioned to a sleep status (T1007).

Figure 7:
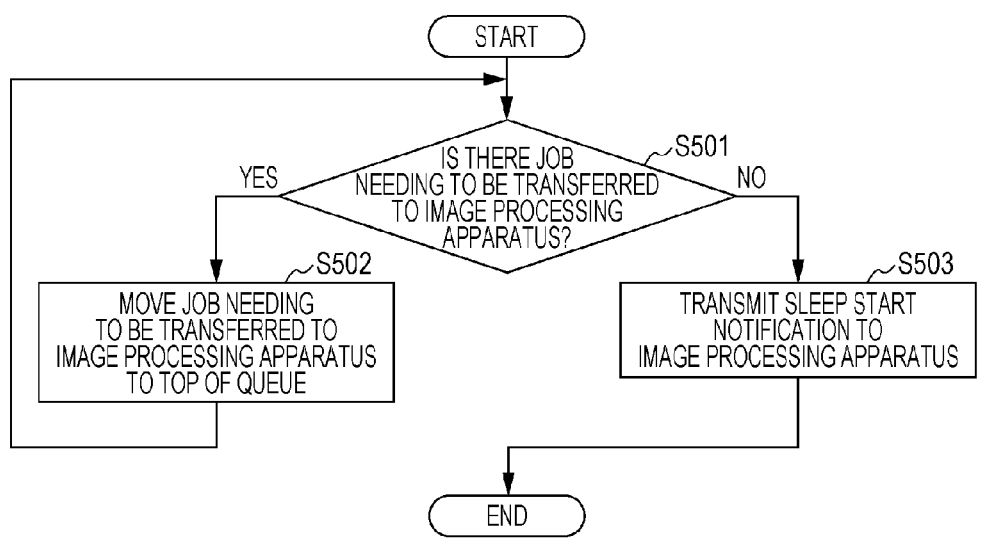
FIG. 7 is a flowchart for describing a control method of the printing control apparatus.

FIG. 7 is a flowchart for describing a control method of the printing control apparatus 102 illustrating the present embodiment. The steps illustrated in the present example are realized by modules illustrated in FIG. 4 being read from the HDD unit 205 within the external printing control apparatus 102 at the time of sleep processing, and being executed at the CPU 207. Hereinafter, processing will be described with the modules as controlling entities.

Upon the network control unit 402 receiving a sleep preparation completion notification from the image processing apparatus 101, the sleep control unit 403 issues an instruction to determine the type of a job to the job type determining unit 406.

The job type determining unit 406 determines in S501 whether or not there is a job needing processing at the image processing apparatus 101, out of the jobs to be scheduled for processing within the printing control apparatus 102. In a case of determining that there is a job needing processing at the image processing apparatus 101 as a result, the job type determining unit 406 proceeds to S502. Also, in a case where there is no job needing processing at the image processing apparatus 101, the job type determining unit 406 proceeds to S503, and transmits a sleep start notification corresponding to an instruction permitting transition to the power saving status 5404 to the image processing apparatus 101.

In S502, the job sequence control unit 407 changes the processing sequence of jobs to be scheduled for processing within the printing control apparatus 102 so as to preferentially process a job needing processing at the image processing apparatus 101. There are cases where a new job is input from the information processing apparatus 105, during a job needing processing at the image processing apparatus 101 being preferentially processed. In this case, in a case where determination is made in S501 that this job is a priority job, the job type determining unit 406 changes the sequence of jobs to be scheduled for processing within the processing waiting queue, so that this job is preferentially processed.

As described above, the printing control apparatus 102 according to the present embodiment enables a job needing processing at the image processing apparatus 101 to be preferentially processed, out of jobs to be scheduled for processing. This eliminates cases where the image processing apparatus 101 has to return from sleep immediately after transitioning to a sleep status, and enables transitioning of the image processing apparatus 101 to a sleep status without continuously awaiting ending of processing of a job not needing processing at the image processing apparatus 101. Therefore, more excellent power saving effects can be exhibited with the printing system overall.

Second Embodiment

Figure 8:
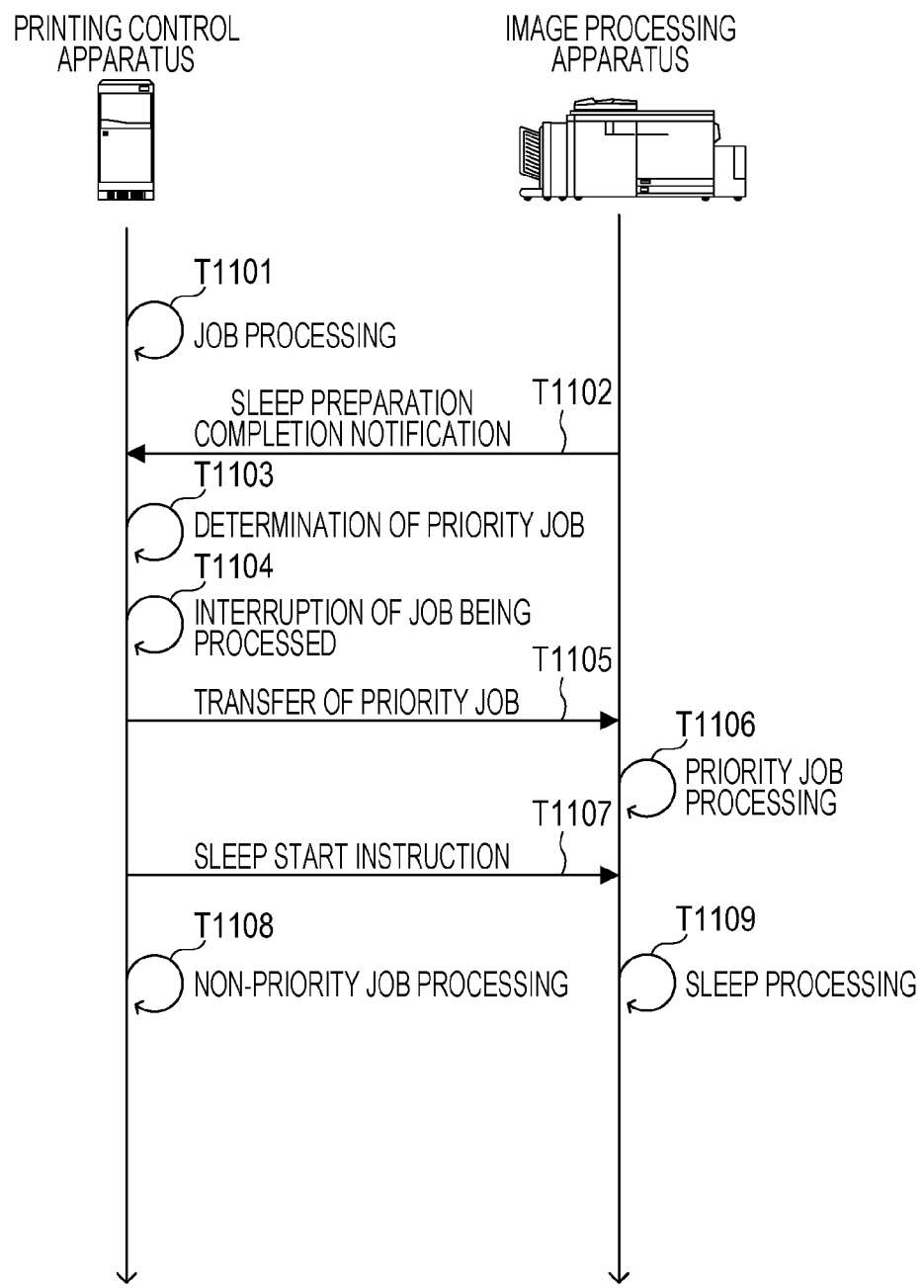
FIG. 8 is a sleep processing sequence example of the printing system.

FIG. 8 is a diagram illustrating a sleep control sequence example of a printing system illustrating the present embodiment. The image processing apparatus 101 according to the present embodiment transmits a sleep preparation completion notification to the printing control apparatus 102 when predetermined time elapses in an idle status (T1102). The printing control apparatus 102 which has received this sleep preparation completion notification searches whether or not there is a job needing processing at the image processing apparatus 101, out of jobs to be scheduled for processing now within the printing control apparatus 102, and sets the corresponding job as a priority job (T1103).

Also, in a case where determination is made that a job being processed at the printing control apparatus 102 is a job not needing processing at the image processing apparatus 101, the printing control apparatus 102 temporarily stops the job being processed (T1104). The printing control apparatus 102 preferentially transmits the job determined to be a priority job to the image processing apparatus 101 regardless of the processing schedule sequence set at the printing control apparatus 102 (T1105). The image processing apparatus 101 performs processing of the received priority job (T1106). The printing control apparatus 102 transmits a sleep start instruction to the image processing apparatus 101 (T1107) at a stage of having checked that the image processing apparatus 101 has ended the processing of the priority job (T1106).

Thereafter, the printing control apparatus 102 resumes the processing of the job not needing processing at the image processing apparatus 101 of which the processing has been interrupted (T1108). The image processing apparatus 101 which has received the sleep start instruction is transitioned to a sleep status (T1109).

Figure 9:
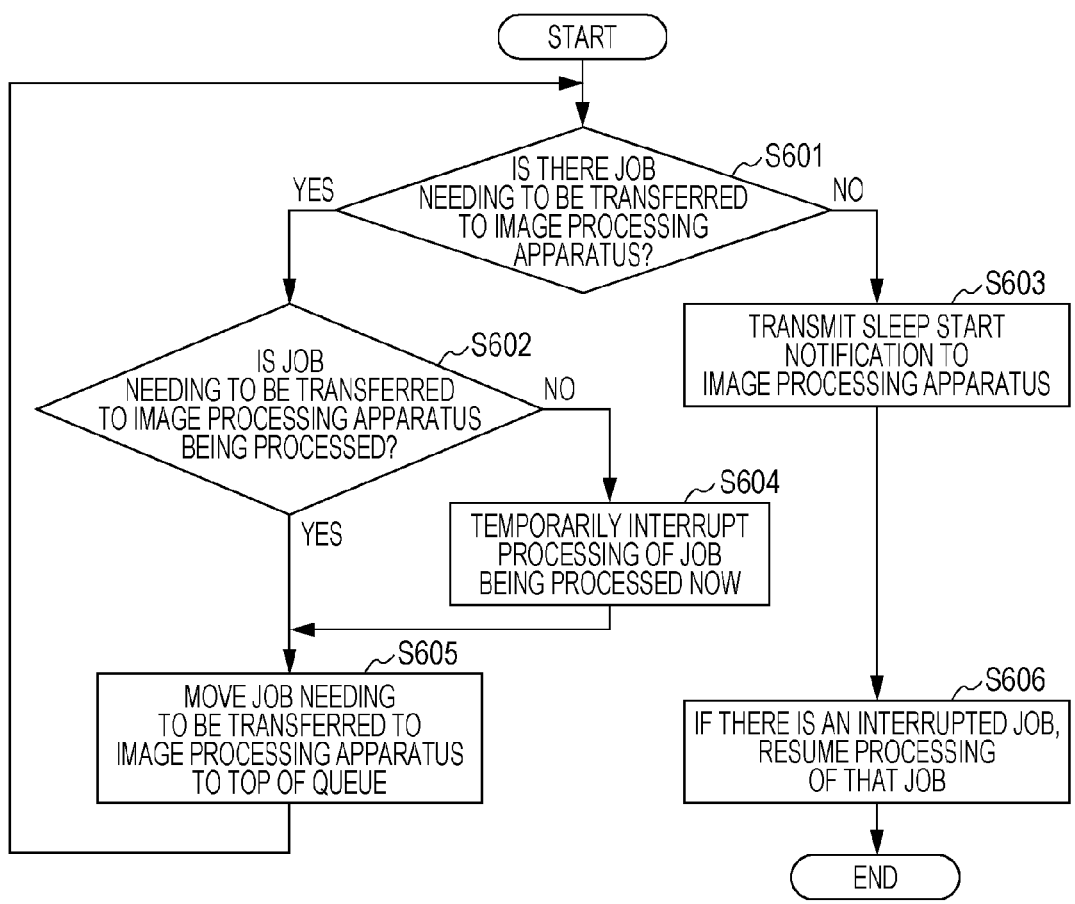
FIG. 9 is a flowchart for describing a control method of the printing control apparatus.

FIG. 9 is a flowchart for describing a control method of the printing control apparatus 102 illustrating the present embodiment. The steps illustrated in the present example are realized by modules illustrated in FIG. 4 being read from the HDD unit 205 within the external printing control apparatus 102 at the time of sleep processing, and being executed at the CPU 207. Hereinafter, processing will be described with the modules as controlling entities.

Upon the network control unit 402 receiving a sleep preparation completion notification from the image processing apparatus 101, the sleep control unit 403 issues an instruction to determine the type of a job to the job type determining unit 406. In S601, the job type determining unit 406 determines whether or not there is a job needing processing at the image processing apparatus 101 within the printing control apparatus 102. As a result thereof, in a case of determining that there is a job needing processing at the image processing apparatus 101, the job type determining unit 406 proceeds to S602, and on the other hand, in a case of determining that there is no job needing processing at the image processing apparatus 101, the job type determining unit 406 proceeds to S603.

In S602, the job type determining unit 406 determines whether or not the job being processed now at the printing control apparatus 102 is a job needing processing at the image processing apparatus 101. The job type determining unit 406 determines whether or not the current status is a status in which a job other than a job needing processing at the image processing apparatus 101 (another job other than that job) is processed. As a result thereof, in a case of determining that the job being processed is a job not needing processing at the image processing apparatus 101, the job type determining unit 406 proceeds to S604, and temporarily interrupts the job being processed now. On the other hand, in a case of determining that the job being processed now at the printing control apparatus 102 is a job needing processing at the image processing apparatus 101, the job type determining unit 406 proceeds to S605.

In S605, the job sequence control unit 407 changes the sequence of jobs to be scheduled for processing within the processing queue within the printing control apparatus 102 so as to preferentially process the job needing processing at the image processing apparatus 101, and returns to S601.

On the other hand, in step S603 the network control unit 405 transmits a sleep start notification corresponding to an instruction permitting transition to the power saving status 5404 to the image processing apparatus 101, and proceeds to S606. In S606, in a case where there is a job temporarily interrupted in the processing in S604, the printing control apparatus 102 stores the job thereof in the top of the processing waiting queue, and resumes the processing of the job thereof, and when this processing is completed, ends this processing.

As described above, the printing control apparatus 102 according to the present embodiment enables a job not needing processing at the image processing apparatus 101, which is currently being processed, to be temporarily interrupted, and enables the processing thereof to be resumed after processing the job needing processing at the image processing apparatus 101. Thus, the image processing apparatus 101 is allowed to transition to a sleep status more smoothly.

Third Embodiment

Figure 10:
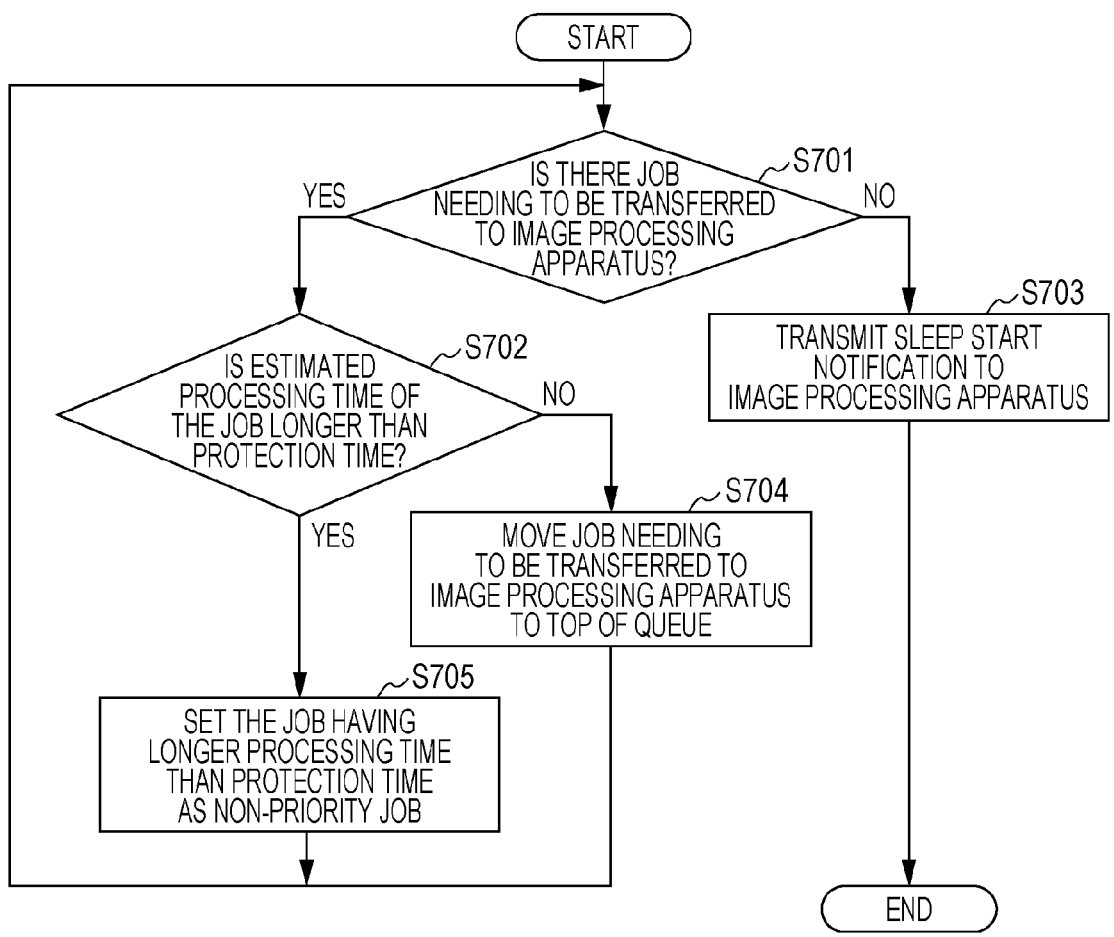
FIG. 10 is a flowchart for describing a control method of the printing control apparatus.

FIG. 10 is a flowchart for describing a control method of the printing control apparatus 102 illustrating the present embodiment. The steps illustrated in the present example are realized by modules illustrated in FIG. 4 being read from the HDD unit 205 within the external printing control apparatus 102 at the time of sleep processing, and being executed at the CPU 207. Hereinafter, processing will be described with the modules as controlling entities.

Upon the network control unit 402 receiving a sleep preparation completion notification from the image processing apparatus 101, the sleep control unit 403 issues an instruction to determine the type of a job to the job type determining unit 406. In S701, the job type determining unit 406 determines whether or not there is a job needing processing at the image processing apparatus 101 within the printing control apparatus 102. As a result thereof, in a case of determining that there is a job needing processing at the image processing apparatus 101, the job type determining unit 406 proceeds to S702. On the other hand, in a case of determining that there is no job needing processing at the image processing apparatus 101, the job type determining unit 406 proceeds to S703, and transmits a sleep start notification corresponding to an instruction permitting transition to the power saving status 5404 to the image processing apparatus 101.

In S702, the job type determining unit 406 calculates the estimated processing time of a job, and determines whether or not the estimated processing time thereof is longer than time which has to be secured until the image processing apparatus 101 goes to sleep again after returning from sleep (hereinafter, protection time). "Protection time" here means time to be secured for the image processing apparatus 101 to transition to the power saving status 5404 again after returning from the power saving status 5404. As a result thereof, in a case where checking is made based on first checking processing that the processing time of the job is longer than the protection time, the job type determining unit 406 proceeds to S705. On the other hand, in a case of checking that the job processing time is shorter, the job type determining unit 406 proceeds to S704.

In S704, the job type determining unit 406 changes the sequence of the processing scheduled jobs within the processing waiting queue of the printing control apparatus 102 so as to preferentially process the job of which the processing time has been determined to be shorter than the protection time, and proceeds to S701.

In S705, the job type determining unit 406 sets the job of which the processing time has been determined to be longer than the protection time as a non-priority job, and does not change the sequence of the processing scheduled jobs within the processing waiting queue of the printing control apparatus 102, and thereafter returns to S701.

As described above, the printing control apparatus 102 according to the present embodiment does not perform the priority processing at the image processing apparatus 101 regarding a job of which the processing time is longer than the protection time, even when this job is a job needing processing at the image processing apparatus 101. In the case of a job of which the processing time is shorter than the protection time, the image processing apparatus 101 can transition to a sleep status immediately after the processing of the job. Accordingly, power saving effects are not lost even in a case where the image processing apparatus 101 has been transitioned to a sleep status once, and thereafter returned from the sleep status. Thus, power saving effects can maximally be obtained while maintaining the execution sequence of jobs set by the user.

Fourth Embodiment

Figure 11:
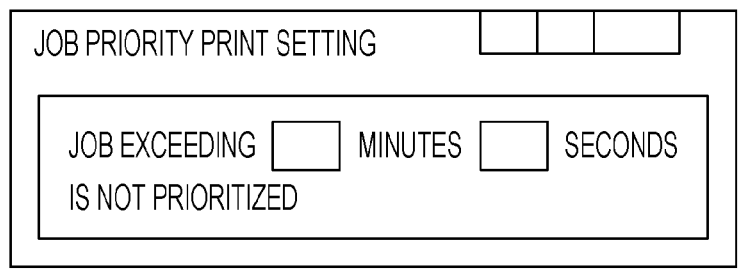
FIG. 11 is a diagram illustrating an example of a UI screen to be displayed on the image processing apparatus.

FIG. 11 is a diagram illustrating an example of a UI screen to be displayed on the operation unit 318 of the image processing apparatus 101 illustrated in FIG. 1. The present example is a UI screen example for a user setting whether to cause the image processing apparatus 101 to preferentially process a job before going to sleep depending on which level of processing time the job has.

Figure 12:
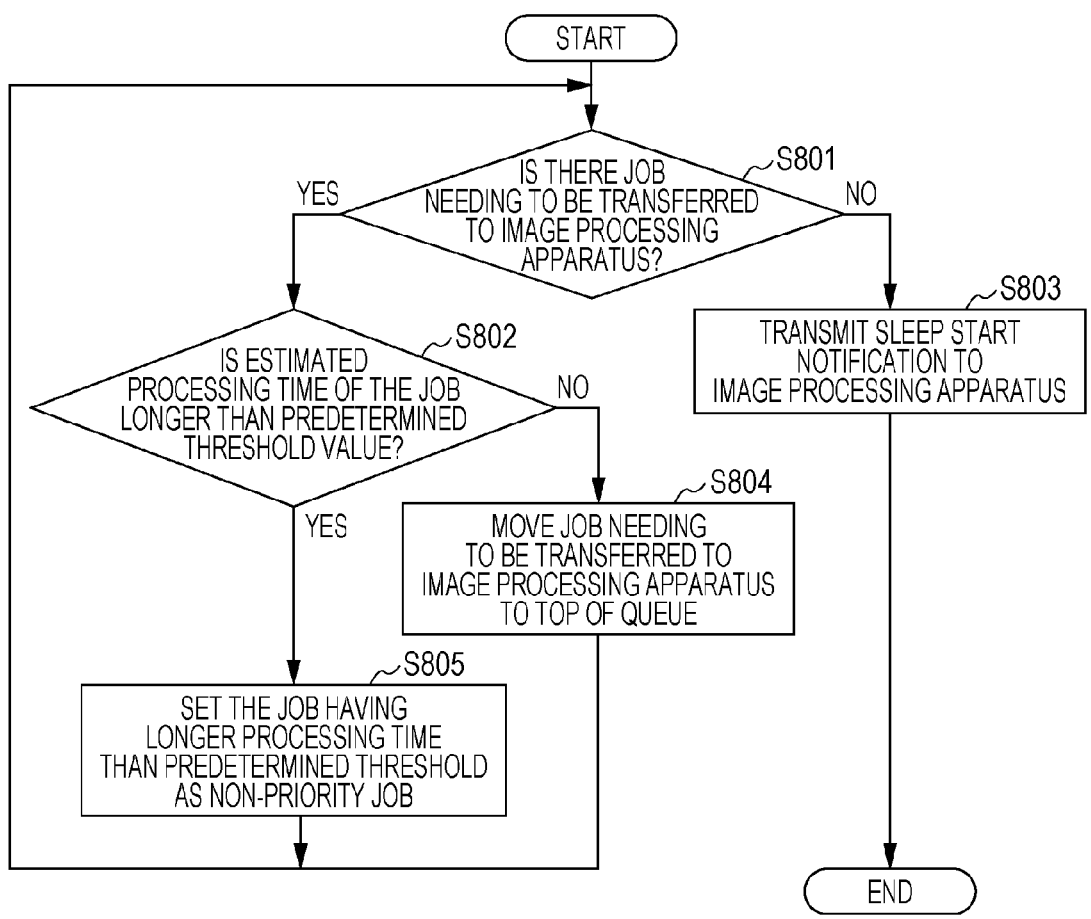
FIG. 12 is a flowchart for describing a control method of the printing control apparatus.

FIG. 12 is a flowchart for describing a control method of the printing control apparatus 102 illustrating the present embodiment. The steps illustrated in the present example are realized by modules illustrated in FIG. 4 being read from the HDD unit 205 within the external printing control apparatus 102 at the time of sleep processing, and being executed at the CPU 207. Hereinafter, processing will be described with the modules as controlling entities. Hereinafter, processing of the printing control apparatus 102 under sleep processing will be described.

Upon the network control unit 402 receiving a sleep preparation completion notification from the image processing apparatus 101, the sleep control unit 403 instructs the job type determining unit 406 to determine the type of a job. In S801, the job type determining unit 406 determines whether or not there is a job needing processing at the image processing apparatus 101 within the printing control apparatus 102. As a result thereof, in a case of determining that there is a job needing processing at the image processing apparatus 101, the job type determining unit 406 proceeds to S802. On the other hand, in a case of determining that there is no job needing processing at the image processing apparatus 101, the job type determining unit 406 proceeds to S803, and transmits a sleep start notification corresponding to an instruction permitting transition to the power saving status 5404 to the image processing apparatus 101.

In S802, the job type determining unit 406 calculates the estimated processing time of the job, and checks whether or not the estimated processing time thereof is longer than a threshold value set by the user using the UI screen illustrated in FIG. 10. As a result thereof, in a case of confirming based on the second confirmation processing that the processing time of the job is longer than the threshold value set by the user, the job type determining unit 406 proceeds to S805, and in a case of confirming that the processing time of the job is shorter, the job type determining unit 406 proceeds to S804.

In S804, the job sequence control unit 407 changes the sequence of the processing scheduled jobs within the processing waiting queue of the printing control apparatus 102 so as to preferentially process the job of which the processing time is determined to be shorter than the threshold value set by the user, and returns to S801.

In S805, the job type determining unit 406 sets the job of which the processing time has been determined to be longer than the threshold value as a non-priority job, and does not change the sequence of the processing scheduled jobs within the processing waiting queue of the printing control apparatus 102, and thereafter returns to S801.

As described above, the printing control apparatus 102 according to the present embodiment does not execute the priority processing at the image processing apparatus 101 regarding a job of which the processing time is longer than the time set by the user, even when this job is a job needing processing at the image processing apparatus 101. Thus, transition of the image processing apparatus 101 to a sleep status can be prevented from being performed at a timing unintended by the user, while maintaining power saving effects.

According to the above embodiments, of jobs stored in the printing control apparatus 102, a job needing processing at the image processing apparatus 101 is preferentially processed, following which a sleep start instruction is transmitted to the image processing apparatus 101. Thus, power saving control can be realized wherein the image processing apparatus 101 is transitioned to a sleep status while suppressing unnecessary power consumption at the image processing apparatus 101 side.

The processes of the present invention may also be realized by a processing apparatus (CPU, processor) of a personal computer (computer) or the like executing software (program) obtained via a network or various storage media.

The present invention is not restricted to the above embodiments, and various modifications (including an organic combination of the embodiments) based on the essence of the present invention may be made, and are not excluded from the scope of the present invention.

According to the present invention, power saving control can be realized which causes an image processing apparatus to be transitioned to a sleep status, while suppressing unnecessary power consumption at the image processing apparatus side.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268454 filed Dec. 7, 2012, which is hereby incorporated by reference herein in its entirety.

What is claimed is:

1. A printing system comprising:
a printing control apparatus; and
an image processing apparatus configured to receive a job transmitted by the printing control unit;
and wherein the image processing apparatus includes
a notification unit configured to notify information indicating that preparation for transition to a power saving status is completed, to the printing control apparatus,
a receiving unit configured to receive an instruction permitting transition to a power saving status from the printing control apparatus, and
a power control unit configured to cause a power status of the image processing apparatus to proceed to a power saving status in response to reception of an instruction permitting transition to the power saving status;
and wherein the printing control apparatus includes
a job receiving unit configured to receive a job to be transmitted to the image processing apparatus, a storage unit configured to store a plurality of received jobs, a judging unit configured to judge whether or not a job to be preferentially transmitted to the image processing apparatus exists among the plurality of received jobs stored in the storage unit after receiving information indicating that preparation of transition to a power saving status is completed from the image processing apparatus, a job transmitting unit configured to transmit, in a case where the judging unit judges that a job to be preferentially transmitted to the image processing apparatus exists, the job to the image processing apparatus with priority over a job stored in the storage unit before the job, and a transmitting unit configured to transmit, in a case where the judging unit judges that no job to be preferentially transmitted to the image processing apparatus exists, an instruction permitting transition to a power saving status to the image processing apparatus.

2. The printing system according to claim 1, wherein the printing control apparatus further includes a determining unit configured to determine, in a case where a job to be preferentially transmitted to the image processing apparatus exists, whether or not another job other than this job is being processed, and an interrupting unit configured to interrupt, in a case where another job other than this job is being processed, processing of the job being processed;

and wherein after interrupting processing of the job being processed, the job transmitting unit transmits a job to be preferentially transmitted to the image processing apparatus to the image processing apparatus with priority over a job stored in the storage unit before the job.

3. The printing system according to claim 1, wherein the printing control apparatus further includes a calculating unit configured to calculate processing time for processing a job to be preferentially transmitted to the image processing apparatus at this image processing apparatus, and a first checking unit configured to check whether or not protection time to be secured until transition to a power saving status is performed again after the image processing apparatus returns from a power saving status exceeds the calculated processing time;

and wherein the job transmitting unit does not transmit a job of which the protection time exceeds the calculated processing time even when this job is a job to be preferentially transmitted to the image processing apparatus.

4. The printing system according to claim 1, wherein the printing control apparatus further includes a setting unit configured to define processing time for deciding whether or not a job should be transmitted to the image processing apparatus, and a second checking unit configured to check whether or not the calculated processing time exceeds the defined processing time;

and wherein the job transmitting unit does not transmit a job exceeding the defined processing time even when this job is a job to be preferentially transmitted to the image processing apparatus.

5. A printing control apparatus configured to transmit a received job to an image processing apparatus, comprising:

a job receiving unit configured to receive a job to be transmitted to the image processing apparatus;

a storage unit configured to store a plurality of received jobs;

a judging unit configured to judge whether or not, a job to be preferentially transmitted to the image processing apparatus exists among the plurality of received jobs stored in the storage unit after receiving information indicating that preparation of transition to a power saving status is completed from the image processing apparatus;

a job transmitting unit configured to transmit, in a case where the judging unit judges that a job to be preferentially transmitted to the image processing apparatus exists, the job to the image processing apparatus with priority over a job stored in the storage unit before the job; and a transmitting unit configured to transmit, in a case where the judging unit judges that no job to be preferentially transmitted to the image processing apparatus exists, an instruction permitting transition to a power saving status to the image processing apparatus.

6. The printing control apparatus according to claim 5, further comprising:

a determining unit configured to determine, in a case where a job to be preferentially transmitted to the image processing apparatus exists, whether or not another job other than this job is being processed; and an interrupting unit configured to interrupt, in a case where determining that another job other than this job is being processed, processing of the job being processed, wherein after interrupting processing of the job being processed, the job transmitting unit transmits a job to be preferentially transmitted to the image processing apparatus to the image processing apparatus with priority over a job stored in the storage unit before the job.

7. The printing control apparatus according to claim 5, further comprising:

a calculating unit configured to calculate processing time for processing a job to be transmitted to the image processing apparatus at this image processing apparatus; and a first checking unit configured to check whether or not protection time to be secured until transition to a power saving status is performed again after the image processing apparatus returns from a power saving status exceeds the calculated processing time, wherein the job transmitting unit does not transmit a job of which the protection time exceeds the calculated processing time even when this job is a job to be preferentially transmitted to the image processing apparatus.

8. The printing control apparatus according to claim 5, further comprising:

a setting unit configured to define processing time for deciding whether or not a job has to be transmitted to the image processing apparatus; and a second checking unit configured to check whether or not the calculated processing time exceeds the defined processing time, wherein the job transmitting unit does not transmit a job exceeding the defined processing time even when this job is a job to be preferentially transmitted to the image processing apparatus.

9. A control method for a printing control apparatus configured to transmit a job to be received to an image processing apparatus, the method comprising:

receiving a job to be transmitted to the image processing apparatus;

storing a plurality of received jobs in a storage unit;

judging whether or not a job to be preferentially transmitted to the image processing apparatus exists among the plurality of received jobs stored in the storage unit after receiving information indicating that preparation of transition to a power saving status is completed from the image processing apparatus;

sending, in a case of judging that a job to be preferentially transmitted to the image processing apparatus exists, the job to the image processing apparatus with priority over a job stored in the storage unit before the job; and transmitting, in a case of judging that no job to be preferentially transmitted to the image processing apparatus exists, an instruction permitting transition to a power saving status to the image processing apparatus.

10. The control method for a printing control apparatus according to claim 9, further comprising:

determining, in a case where a job to be preferentially transmitted to the image processing apparatus exists, whether or not another job other than this job is being processed; and interrupting, in a case where another job other than this job is being processed, processing of the job being processed, wherein after interrupting processing of the job being processed, the sending sends a job to be preferentially transmitted to the image processing apparatus to the image processing apparatus with priority over a job stored in the storage unit before the job.

11. The control method for a printing control apparatus according to claim 9, further comprising:

calculating processing time for processing a job to be transmitted to the image processing apparatus at this image processing apparatus; and first checking of whether or not protection time to be secured until transition to a power saving status is performed again after the image processing apparatus returns from a power saving status exceeds the calculated processing time, wherein a job of which the protection time exceeds the calculated processing time is not sent in the sending, even when this job is a job to be preferentially transmitted to the image processing apparatus.

12. The control method for a printing control apparatus according to claim 9, further comprising:

defining processing time for deciding whether or not a job should be transmitted to the image processing apparatus; and second checking of whether or not the calculated processing time exceeds the defined processing time, wherein a job exceeding the defined processing time is not transmitted in the transmitting, even when this job is a job to be preferentially transmitted to the image processing apparatus.

13. A program stored on a non-transitory computer-readable medium causing a computer to execute the control method for a printing control apparatus according to claim 9.

* * * * *